US009043150B2

(12) United States Patent
Forstall et al.

(10) Patent No.: US 9,043,150 B2
(45) Date of Patent: May 26, 2015

(54) ROUTING APPLICATIONS FOR NAVIGATION

(71) Applicant: Apple Inc., Cupertino, CA (US)

(72) Inventors: Scott Forstall, Los Altos, CA (US); Marcel van Os, San Francisco, CA (US); Bradford A. Moore, San Francisco, CA (US); Brady A. Law, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 53 days.

(21) Appl. No.: 13/632,080

(22) Filed: Sep. 30, 2012

(65) Prior Publication Data

US 2013/0325340 A1 Dec. 5, 2013

Related U.S. Application Data

(60) Provisional application No. 61/655,995, filed on Jun. 5, 2012, provisional application No. 61/656,015, filed on Jun. 6, 2012, provisional application No. 61/656,080, filed on Jun. 6, 2012, provisional application No. 61/657,858, filed on Jun. 10, 2012, provisional application No. 61/699,813, filed on Sep. 11, 2012.

(51) Int. Cl.
*G01C 21/34* (2006.01)
*G01C 21/00* (2006.01)
*G01C 21/36* (2006.01)

(52) U.S. Cl.
CPC .............. *G01C 21/00* (2013.01); *G01C 21/362* (2013.01)

(58) Field of Classification Search
USPC ............. 707/723, 722; 701/425, 533, 71, 423
See application file for complete search history.

(56) References Cited

U.S. PATENT DOCUMENTS

| 5,878,368 | A | 3/1999 | DeGraaf | |
|---|---|---|---|---|
| 6,360,167 | B1 | 3/2002 | Millington et al. | |
| 6,480,783 | B1 | 11/2002 | Myr | |
| 6,615,130 | B2 | 9/2003 | Myr | |
| 7,706,973 | B2 * | 4/2010 | McBride et al. | 701/423 |
| 7,917,285 | B2 * | 3/2011 | Rothschild | 701/420 |
| 7,957,871 | B1 | 6/2011 | Echeruo | |
| 8,583,373 | B2 * | 11/2013 | Hicks | 701/533 |
| 8,607,167 | B2 * | 12/2013 | Matas et al. | 715/863 |
| 8,739,070 | B2 * | 5/2014 | Mullen | 715/834 |
| 2003/0109266 | A1 | 6/2003 | Rafiah et al. | |

(Continued)

FOREIGN PATENT DOCUMENTS

EP 1995564 11/2008

OTHER PUBLICATIONS

Ruhs, Chris, "My Favorite Android Apps: Maps," Jun. 24, 2011, 1 page, available at http://www.youtube.com/watch?v=v2aRkLkLT3s.

*Primary Examiner* — John Q Nguyen
*Assistant Examiner* — Aaron Smith
(74) *Attorney, Agent, or Firm* — Adeli LLP

(57) ABSTRACT

Some embodiments provide a mapping application that provides routing information to third-party applications on a device. The mapping application receives route data that includes first and second locations. Based on the route data, the mapping application provides a set of routing applications that provide navigation information. The mapping application receives a selection of a routing application in the set of routing applications. The mapping application passes the route data to the selected routing application in order for the routing application to provide navigation information.

26 Claims, 22 Drawing Sheets

(56) References Cited

U.S. PATENT DOCUMENTS

| | | |
|---|---|---|
| 2004/0128066 A1 | 7/2004 | Kudo et al. |
| 2005/0125148 A1 | 6/2005 | Van Buer et al. |
| 2007/0208502 A1 | 9/2007 | Sakamoto et al. |
| 2008/0059061 A1 | 3/2008 | Lee |
| 2009/0005981 A1 | 1/2009 | Forstall et al. |
| 2009/0119001 A1 | 5/2009 | Moussaeiff et al. |
| 2010/0123737 A1 | 5/2010 | Williamson et al. |
| 2010/0211632 A1* | 8/2010 | Saarinen ................. 709/203 |
| 2010/0280853 A1 | 11/2010 | Petralia et al. |
| 2011/0083167 A1 | 4/2011 | Carpenter et al. |
| 2011/0282759 A1* | 11/2011 | Levin et al. ............. 705/26.41 |
| 2012/0023097 A1* | 1/2012 | LeBeau et al. ............ 707/723 |
| 2012/0166281 A1* | 6/2012 | Sartipi .................... 705/14.54 |
| 2013/0030954 A1* | 1/2013 | Liu et al. ................. 705/26.7 |
| 2013/0230840 A1* | 9/2013 | Parkar ..................... 434/322 |
| 2013/0326467 A1* | 12/2013 | Nair et al. ............... 717/101 |

* cited by examiner

ROUTING APPLICATIONS FOR NAVIGATION

CLAIM OF BENEFIT TO PRIOR APPLICATIONS

This application claims the benefit of U.S. Provisional Patent Application 61/655,995, filed Jun. 5, 2012; U.S. Provisional Patent Application 61/656,015, filed Jun. 6, 2012; U.S. Provisional Patent Application 61/656,080, filed Jun. 6, 2012; U.S. Provisional Patent Application 61/657,858, filed Jun. 10, 2012; and U.S. Provisional Patent Application 61/699,813, filed Sep. 11, 2012. U.S. Provisional Patent Applications 61/655,995, 61/656,015, 61/656,080, 61/657,858 and 61/699,813 are hereby incorporated by reference.

BACKGROUND

Many of today's navigation devices allow a user to provide location data and, in response, the device will provide directions from a location to one or more locations. The navigation devices may also include other features to facilitate providing directions to the user. For example, some devices include turn-by-turn navigation direction as well as a list of directions. Numerous devices include a speech capability that verbally provides directions for the user as the user is traveling. Some navigation devices provide traffic information (verbally and/or graphically) so that the user may change routes to avoid areas of heavy traffic.

Regardless of feature included in these navigation devices, the devices are typically designed to provide directions for a particular purpose. For example, a countless number of navigation devices are designed to provide directions for driving. Some devices are designed for providing directions on trails for hiking. Other devices are designed to provide directions for cycling.

BRIEF SUMMARY

Some embodiments of the invention provide an integrated mapping application that includes several useful modalities, including location browsing, map searching, route identifying and route navigating operations. These operations are complex tasks that, while complementary, each have very different user interface requirements. The mapping application in some embodiment has a novel UI design that addresses the difficult challenges of integrating the needed controls for each of its different modalities into a seamless and cohesive application user interface. The novel UI design and the application are defined to be executed by a device that has a touch-sensitive screen that displays the output of the application. In some embodiments, this device has a multi-touch interface for allowing a user to provide touch and gestural inputs through the screen to interact with the application.

In some embodiments, a goal of the mapping application UI is that on-screen controls are kept to a minimum in order to display as much of the interactive map as possible. One element in this design is a button cluster that floats on top of the content itself rather than taking up the full-width of the screen, as typical in phone UI elements. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

One example of an adaptive, floating control in some embodiments is the list control. When there are opportunities to display a list of items, be it a list of instructions in a route or a list of search results when multiple results are found for a given query, the mapping application of some embodiments displays a list button as one of the floating controls. Tapping the list button brings up a modal list view in some embodiments. Having a modal list view keeps the mapping application simple and the map front and center. In some embodiments, the list view itself is adapted and optimized for the type of list being displayed, in that search results will be displayed with star ratings when available and route steps will include instructional arrows.

Another floating control is a control for viewing map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

In addition to the 3D control, the mapping application of some embodiments allows a user to transition a map view from a two-dimensional (2D) presentation to a 3D presentation through gestural inputs of the multi-touch interface of the device. For instance, through a two finger gestural input, the user can be made to experience "pushing" down a 2D map view into a 3D map view, or "pulling" up a 3D map view into a 2D map view. This can also be thought of as pulling down a virtual camera from a 2D (directly from above) view into a 3D (side angle) view through the two-finger gesture. As further described below, the 3D view of the map is generated in some embodiments by rendering the map view from a particular position that can be conceptually thought of as the position of a virtual camera that is capturing the map view.

Through gestural inputs, the mapping application allows a user to also rotate a 2D or 3D map in some embodiments. The mapping application in some embodiments is a vector mapping application that allows for direct manipulations (such as rotation and 2D/3D manipulations) of the map while browsing. However, some of the effects to the map can be disorienting. Without an easy way to get back to north-up orientation (i.e., an orientation where the north direction is aligned with the top of the device), some user's may have difficulty interacting with the map views. To solve this, the mapping application of some embodiments provides an unobtrusive floating compass control on the map that serves both as an indicator that points to north and as a button to restore a north-up orientation. To further minimize clutter on the map, the mapping application only shows the button only in a limited number of situations (such as when the map is rotated, etc.).

In order to minimize the number of on-screen controls, certain less frequently used actions are placed in a secondary UI screen behind a "page curl" that is displayed on a map view that is provided by the application. In some embodiments, the page curl is permanently displayed on at least some of the map views that the application provides. For instance, in some embodiments, the application displays the page curl permanently on the initial map view that it provides for allowing a user to browse or search a location or to identify a route. The page curl is a selectable UI item that (1) indicates the location of another set of controls that are conceptually "behind" the current view, and (2) when selected, directs the application to present an animation that "peels" off the current view to display another view that shows the other set of controls. The use of the page curl allows the application to display more of the map while offering an unobtrusive way to access further functionality that is provided by the other set of controls. Additionally, in some embodiments, the application does not use the page curl in map views where the additional functionality is deemed to be inappropriate to the task at hand. For instance, in some embodiments, the application does not display this page curl while presenting the map view that is used during navigation.

The search field of the mapping application in some embodiments is another UI tool that the application employs to make the transition between the different modalities seamless. In some embodiments, a user can initiate a search by tapping in the search field. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. Some embodiments, however, include recent route directions only when the user has not yet entered any text into the search field. Once text is entered, the mapping application removes recent route directions from the search completions table. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term is a prefix of an address label (e.g., 'Wo' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

Another way that the mapping application tightly integrates the search and route identification experience is by providing several different ways to get directions. As mentioned above, the search table provides quick access to recently used routes. For any location selected on the map view, the mapping application in some embodiments also presents an info display banner (e.g., a window) that displays a quick-route navigation UI control (e.g., button) that fetches a route (e.g., a driving route) from the current location to that pin without ever leaving the map view. In addition, the mapping application also provides a selectable direction UI control (e.g., button) on the main map view (e.g., in the top left corner), which when selected presents a modal directions editing interface that enables the user to request more customized routes, such as routes that do not begin from the current location or a walking route instead of just driving routes. In some embodiments, the mapping application provides several different selectable routes based on a route query that it receives through the direction UI control. In such embodiments, the user can then select one of the routes. In some embodiments, one of the routes is presented as a default selected route, and the user can change the selected route to be one of the other presented routed. It should be noted that while neither the route history entries in the search field nor quick-route navigation control perform actions that cannot be achieved with the direction item, they serve as important accelerators that make it much easier to obtain the most commonly desired routes.

Once route directions have been obtained, they remain present until they are explicitly cleared. This enables the mapping application to enter a mode that is optimized for navigation. The navigation mode has many novel features. One novel feature is that at any time while navigating, the user can move between a full-screen mode that presents a display view optimized for turn-by-turn directions and an overview mode that presents a display view of the remaining route that better accommodate browsing. Some embodiments also allow for a search to be performed while navigating in the overview mode. For instance, some embodiments provide a pull down handle that allows the search field to be pulled into the overview display. Alternatively, or conjunctively, some embodiments allow for searches to be performed during navigation through a voice-recognition input of the device of some embodiments.

Continuity between the overview mode and the full-screen mode is achieved by an in-place transition in the map and a constant set of controls. To enter full-screen mode, the application in some embodiments (1) automatically hides the floating controls and a bar (containing UI controls) along the top, (2) completely uncurls the map. During the full-screen mode, the application restricts touch interaction with the map. In some embodiments, a tap is required to access the controls that were automatically hidden, and even then they are adapted towards a full-screen navigation look, with a prominent display of the ETA in the bar along the top.

Another novel feature is that at any time while navigating, it is always easy to stop navigation in both overview and full-screen modes by selecting a control to end navigation. Another novel feature is that at any time while navigating, the user can modify the turn-by-turn navigation view to present alternative three-dimensional (3D) views or to present even a two-dimensional (2D) view. In some embodiments, the 3D turn-by-turn navigation is an animated rendering of navigated route that is rendered from the vantage point of a virtual camera that traverses along the direction of the route based on the traversal direction and speed of the user, which in some embodiments is captured by directional data (e.g., GPS data, triangulated cell-tower data, etc.) associated with the device.

While navigating, the mapping application of some embodiments allows a user to change the position of the virtual camera (i.e., the position from which the navigated route is rendered) through gestural input on the device's screen. Movement of the virtual camera (i.e., movement of the position from which the route is rendered) allows the mapping application to present alternative 3D view. Some embodiments even use the virtual camera to render a top-down 2D view for the turn-by-turn navigation, while other embodiments render the top-down 2D view by zooming in and out of a 2D map. In some embodiments, the mapping application presents a 3D button that serves both as 3D indicator and 3D initiator/toggle.

Different embodiments provide different gestural inputs to adjust the 3D/2D view during turn-by-turn navigation. In some embodiments, the gestural input is a two-finger pinching/spreading operation to adjust the zoom level. This adjustment of the zoom level inherently adjusts the position and rotation of the camera with respect to the route direction, and thereby changes the 3D perspective view of the route direction. Alternatively, other embodiments provide other gestural inputs (e.g., a finger drag operation) that change the position of the camera instead of or in addition to the zoom operation. In yet other embodiments, a gestural input (e.g., a finger drag operation) momentarily changes the viewing direction of the camera to allow a user to momentarily glance to a side of the navigated route. In these embodiments, the application returns the camera to its previous view along the route after a short time period.

Another novel feature of the mapping application is the realistic-looking road signs that are used during navigation and during the browsing of an identified route. In some embodiments, the signs are textured images that bear a strong resemblance to actual highway signs, and they include instructional arrows, text, shields, and distance. The mapping application of some embodiments presents a wide number of variants in a large number of different contexts. For maneuvers that are close together, a secondary sign is presented hanging just beneath the primary sign. Signs are presented in different colors according to the regional norms in some embodiments. Also, as one maneuver is passed during navigation, the mapping application animates the sign away with a motion that mimics a sign passing overhead on the highway. When a maneuver is approached, the mapping application draws attention to the sign with a subtle animation (e.g., a shimmer across the entire sign).

As mentioned above, the mapping application of some embodiments uses the realistic-looking road signs to provide a novel method of browsing a route that it has identified. For instance, in some embodiments, the mapping application allows a user to select and scroll through the signs of the junctures along an identified route when it presents the identified route to the user. As the user scrolls through each sign, the portion of the route associated with the currently in-focus sign is presented or highlighted (e.g., through color highlighting or through another geometry (e.g., a circle or other marker) marking the portion). Alternatively, or conjunctively, the user can scroll through each sign by selecting different junctures of the route in order to view the sign associated with that juncture. Some of these embodiments provide this interaction only for routes that are not defined between a user's current location and a destination. In other words, these embodiments do not provide this browsing experience when a route is presented that connects the user's current location to a destination. Other embodiments, however, provide the route browsing experience through the road signs in other or all other contexts in which a route is displayed.

In some embodiments, the mapping application provides a feature that enables integration with other routing applications available on or for the device. When a user specifies start and ends locations and enables the feature when requesting route directions, the mapping application provides the user with a list of relevant third-party routing applications. In some embodiments, the mapping application displays the relevant routing applications in two sections—a section for relevant routing applications that are installed on the device and another section for relevant routing applications that are available but not yet installed on the device. The user may then select one of the displayed routing applications to provide route directions or select an available routing application to install and then provide route directions.

The above-described features as well as some other features of the mapping application of some embodiments are further described below. In the description above and below, many of the features are described as part of an integrated mapping application that provides novel location browsing, locating searching, route identifying and route navigating operations. However, one of ordinary skill will realize that these novel operations are performed in other embodiments by applications that do not perform all of these operations, or perform other operations in addition to these operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
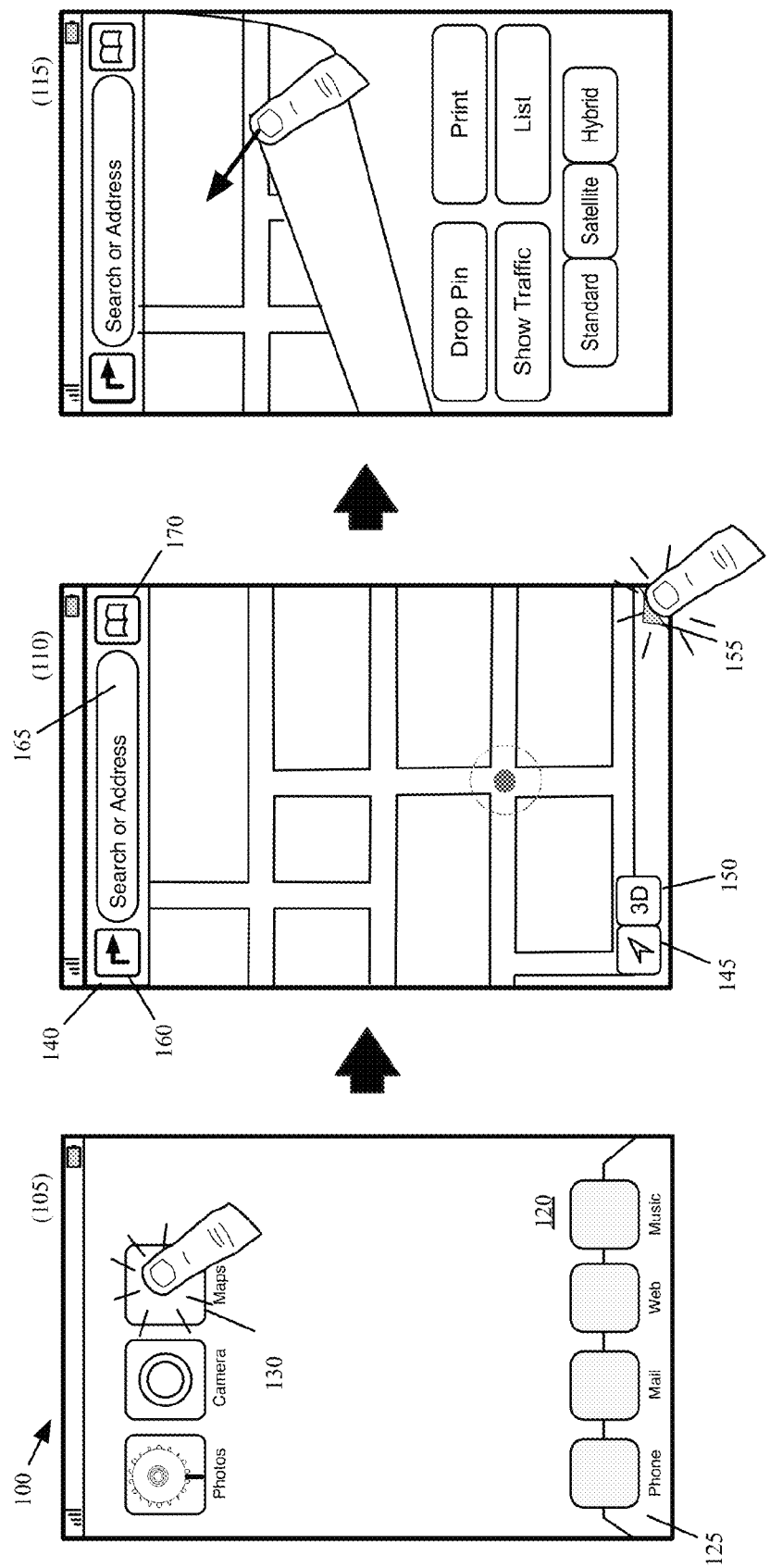
FIG. 1 conceptually illustrates an example of a device that executes an integrated mapping application of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an integrated mapping application that includes several useful modalities, including location browsing, map searching, route identifying and route navigating operations. These operations are complex tasks that, while complementary, each have very different user interface requirements. The mapping application in some embodiment has a novel UI design that addresses the difficult challenges of integrating the needed controls for each of its different modalities into a seamless and cohesive application user interface. The novel UI design and the application are defined to be executed by a device that has a touch-sensitive screen that displays the output of the application. In some embodiments, this device has a multi-touch interface for allowing a user to provide touch and gestural inputs through the screen to interact with the application.

In some embodiments, a goal of the mapping application UI is that on-screen controls are kept to a minimum in order to display as much of the interactive map as possible. One element in this design is a button cluster that floats on top of the content itself rather than taking up the full-width of the screen, as typical in phone UI elements. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

One example of an adaptive, floating control in some embodiments is the list control. When there are opportunities to display a list of items, be it a list of instructions in a route or a list of search results when multiple results are found for a given query, the mapping application of some embodiments displays a list button as one of the floating controls. Tapping the list button brings up a modal list view in some embodiments. Having a modal list view keeps the mapping application simple and the map front and center. In some embodiments, the list view itself is adapted and optimized for the type of list being displayed, in that search results will be displayed with star ratings when available and route steps will include instructional arrows.

Another floating control is a control for viewing map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

In addition to the 3D control, the mapping application of some embodiments allows a user to transition a map view from a two-dimensional (2D) presentation to a 3D presentation through gestural inputs of the multi-touch interface of the device. For instance, through a two finger gestural input, the user can be made to experience "pushing" down a 2D map view into a 3D map view, or "pulling" up a 3D map view into a 2D map view. This can also be thought of as pulling down a virtual camera from a 2D (directly from above) view into a 3D (side angle) view through the two-finger gesture. As further described below, the 3D view of the map is generated in some embodiments by rendering the map view from a particular position that can be conceptually thought of as the position of a virtual camera that is capturing the map view.

Through gestural inputs, the mapping application allows a user to also rotate a 2D or 3D map in some embodiments. The mapping application in some embodiments is a vector mapping application that allows for direct manipulations (such as rotation and 2D/3D manipulations) of the map while browsing. However, some of the effects to the map can be disorienting. Without an easy way to get back to north-up orientation (i.e., an orientation where the north direction is aligned with the top of the device), some user's may have difficulty interacting with the map views. To solve this, the mapping application of some embodiments provides an unobtrusive floating compass control on the map that serves both as an indicator that points to north and as a button to restore a north-up orientation. To further minimize clutter on the map, the mapping application only shows the button only in a limited number of situations (such as when the map is rotated, etc.).

In order to minimize the number of on-screen controls, certain less frequently used actions are placed in a secondary UI screen behind a "page curl" that is displayed on a map view that is provided by the application. In some embodiments, the page curl is permanently displayed on at least some of the map views that the application provides. For instance, in some embodiments, the application displays the page curl permanently on the initial map view that it provides for allowing a user to browse or search a location or to identify a route. The page curl is a selectable UI item that (1) indicates the location of another set of controls that are conceptually "behind" the current view, and (2) when selected, directs the application to present an animation that "peels" off the current view to display another view that shows the other set of controls. The use of the page curl allows the application to display more of the map while offering an unobtrusive way to access further functionality that is provided by the other set of controls. Additionally, in some embodiments, the application does not use the page curl in map views where the additional functionality is deemed to be inappropriate to the task at hand.

For instance, in some embodiments, the application does not display this page curl while presenting the map view that is used during navigation.

The search field of the mapping application in some embodiments is another UI tool that the application employs to make the transition between the different modalities seamless. In some embodiments, a user can initiate a search by tapping in the search field. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. Some embodiments, however, include recent route directions only when the user has not yet entered any text into the search field. Once text is entered, the mapping application removes recent route directions from the search completions table. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term is a prefix of an address label (e.g., 'Wo' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

Another way that the mapping application tightly integrates the search and route identification experience is by providing several different ways to get directions. As mentioned above, the search table provides quick access to recently used routes. For any location selected on the map view, the mapping application in some embodiments also presents an info display banner (e.g., a window) that displays a quick-route navigation UI control (e.g., button) that fetches a route (e.g., a driving route) from the current location to that pin without ever leaving the map view. In addition, the mapping application also provides a selectable direction UI control (e.g., button) on the main map view (e.g., in the top left corner), which when selected presents a modal directions editing interface that enables the user to request more customized routes, such as routes that do not begin from the current location or a walking route instead of just driving routes. In some embodiments, the mapping application provides several different selectable routes based on a route query that it receives through the direction UI control. In such embodiments, the user can then select one of the routes. In some embodiments, one of the routes is presented as a default selected route, and the user can change the selected route to be one of the other presented routed. It should be noted that while neither the route history entries in the search field nor quick-route navigation control perform actions that cannot be achieved with the direction item, they serve as important accelerators that make it much easier to obtain the most commonly desired routes.

Once route directions have been obtained, they remain present until they are explicitly cleared. This enables the mapping application to enter a mode that is optimized for navigation. The navigation mode has many novel features. One novel feature is that at any time while navigating, the user can move between a full-screen mode that presents a display view optimized for turn-by-turn directions and an overview mode that presents a display view of the remaining route that better accommodate browsing. Some embodiments also allow for a search to be performed while navigating in the overview mode. For instance, some embodiments provide a pull down handle that allows the search field to be pulled into the overview display. Alternatively, or conjunctively, some embodiments allow for searches to be performed during navigation through a voice-recognition input of the device of some embodiments.

Continuity between the overview mode and the full-screen mode is achieved by an in-place transition in the map and a constant set of controls. To enter full-screen mode, the application in some embodiments (1) automatically hides the floating controls and a bar (containing UI controls) along the top, (2) completely uncurls the map. During the full-screen mode, the application restricts touch interaction with the map. In some embodiments, a tap is required to access the controls that were automatically hidden, and even then they are adapted towards a full-screen navigation look, with a prominent display of the ETA in the bar along the top.

Another novel feature is that at any time while navigating, it is always easy to stop navigation in both overview and full-screen modes by selecting a control to end navigation. Another novel feature is that at any time while navigating, the user can modify the turn-by-turn navigation view to present alternative three-dimensional (3D) views or to present even a two-dimensional (2D) view. In some embodiments, the 3D turn-by-turn navigation is an animated rendering of navigated route that is rendered from the vantage point of a virtual camera that traverses along the direction of the route based on the traversal direction and speed of the user, which in some embodiments is captured by directional data (e.g., GPS data, triangulated cell-tower data, etc.) associated with the device.

While navigating, the mapping application of some embodiments allows a user to change the position of the virtual camera (i.e., the position from which the navigated route is rendered) through gestural input on the device's screen. Movement of the virtual camera (i.e., movement of the position from which the route is rendered) allows the mapping application to present alternative 3D view. Some embodiments even use the virtual camera to render a top-down 2D view for the turn-by-turn navigation, while other embodiments render the top-down 2D view by zooming in and out of a 2D map. In some embodiments, the mapping application presents a 3D button that serves both as 3D indicator and 3D initiator/toggle.

Different embodiments provide different gestural inputs to adjust the 3D/2D view during turn-by-turn navigation. In some embodiments, the gestural input is a two-finger pinching/spreading operation to adjust the zoom level. This adjustment of the zoom level inherently adjusts the position and rotation of the camera with respect to the route direction, and thereby changes the 3D perspective view of the route direction. Alternatively, other embodiments provide other gestural inputs (e.g., a finger drag operation) that change the position of the camera instead of or in addition to the zoom operation. In yet other embodiments, a gestural input (e.g., a finger drag operation) momentarily changes the viewing direction of the camera to allow a user to momentarily glance to a side of the navigated route. In these embodiments, the application returns the camera to its previous view along the route after a short time period.

Another novel feature of the mapping application are the realistic-looking road signs that are used during navigation and during the browsing of an identified route. In some embodiments, the signs are textured images that bear a strong resemblance to actual highway signs, and they include instructional arrows, text, shields, and distance. The mapping application of some embodiments presents a wide number of variants in a large number of different contexts. For maneuvers that are close together, a secondary sign is presented hanging just beneath the primary sign. Signs are presented in different colors according to the regional norms in some embodiments. Also, as one maneuver is passed during navigation, the mapping application animates the sign away with a motion that mimics a sign passing overhead on the highway. When a maneuver is approached, the mapping application draws attention to the sign with a subtle animation (e.g., a shimmer across the entire sign).

As mentioned above, the mapping application of some embodiments uses the realistic-looking road signs to provide a novel method of browsing a route that it has identified. For instance, in some embodiments, the mapping application allows a user to select and scroll through the signs of the junctures along an identified route when it presents the identified route to the user. As the user scrolls through each sign, the portion of the route associated with the currently in-focus sign is presented or highlighted (e.g., through color highlighting or through another geometry (e.g., a circle or other marker) marking the portion). Alternatively, or conjunctively, the user can scroll through each sign by selecting different junctures of the route in order to view the sign associated with that juncture. Some of these embodiments provide this interaction only for routes that are not defined between a user's current location and a destination. In other words, these embodiments do not provide this browsing experience when a route is presented that connects the user's current location to a destination. Other embodiments, however, provide the route browsing experience through the road signs in other or all other contexts in which a route is displayed.

In some embodiments, the mapping application provides a feature that enables integration with other routing applications available on or for the device. When a user to specifies start and ends locations and enables the feature when requesting route directions, the mapping application provides the user with a list of relevant third-party routing applications. In some embodiments, the mapping application displays the relevant routing applications in two sections—a section for relevant routing applications that are installed on the device and another section for relevant routing applications that are available but not yet installed on the device. The user may then select one of the installed routing applications to provide route directions or select an available routing application to install and then provide route directions.

The above-described features as well as some other features of the mapping application of some embodiments are further described below. In the description above and below, many of the features are described as part of an integrated mapping application that provides novel location browsing, locating searching, route identifying and route navigating operations. However, one of ordinary skill will realize that these novel operations are performed in other embodiments by applications that do not perform all of these operations, or perform other operations in addition to these operations.

Several more detailed embodiments of the invention are described in the sections below. Section I provides a conceptual description of a map browsing feature of the mapping application of some embodiments. Next, Section II conceptually describes a location search feature of the mapping application of some embodiments. Section III follows this with a description of generating routes according to some embodiments of the invention. Next, Section IV describes a routing application feature of the mapping application of some embodiments. Section V provides a description of several electronic systems that implement some embodiments of the invention. Finally, Section VI describes a map service environment in which the mapping application of some embodiments operates.

I. Map Browsing

Some embodiments of the invention provide an integrated mapping application that includes several useful modalities, including location browsing, map searching, route identifying and route navigating operations. The mapping application in some embodiment is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

A. General Controls

FIG. 1 illustrates an example of a device 100 that executes an integrated mapping application of some embodiments of the invention. This application has a novel user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows three stages 105, 110, and 115 of interaction with the mapping application. The first stage 105 shows device's UI 120, which includes several icons of mapping applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments (1) displays a map of the current location of the device, and (2) several UI controls arranged in a top bar 140, and as floating controls. As shown in FIG. 1, the floating controls include a position control 145, a 3D control 150, and a page curl control 155, while the top bar 140 includes a direction control 160, a search field 165, and a bookmark control 170.

The direction control 160 opens a page through which a user can request a route to be identified between a starting location and an ending location. As further described below, this control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. Some embodiments, however, include recent route directions only when the user has not yet entered any text into the search field. Once text is entered, the mapping application removes recent route directions from the search completions table. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term matches at least part of an address label (e.g., 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows location and routes to be bookmarked by the application. The position control 145 allows the current position of the device to be specifically noted on the map. Once this position control is selected, the application maintains the current position of the device in the center of the map as the device is moving in some embodiments. In some embodiments, it can also identify the direction to which the device currently points. The mapping application of some embodiments identifies the location of the device using the coordinates (e.g., longitudinal, latitudinal, and latitudinal coordinates) in the GPS signal that the device receives at the location of the device. Alternatively or conjunctively, the mapping application uses other methods (e.g., cell tower triangulation) to compute the current location.

The 3D control 150 is a control for viewing map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available). In some embodiments, the 3D control 150 provides at least three different appearances corresponding to some of these indications. For instance, the 3D control gets colored grey when the 3D view of the map is unavailable, black when the 3D view is available but the map is in the 2D view, and blue when the map is in the 3D view. In some embodiments, the 3D control has a fourth appearance (e.g., a button showing a building image or shape) when the immersive 3D map presentation is available at a given zoom level. Immersive and non-immersive 3D presentations are described further in concurrently filed U.S. patent application Ser. No. 13/632,036, now published as U.S. Publication number 2013/0321400, entitled "3D Map Views for 3D Maps". U.S. patent application Ser. No. 13/632,036, now published as U.S. Publication number 2013/0321400, is incorporated herein by reference.

The page curl control 155 is a control that allows the application to minimize the number of on-screen controls, by placing certain less frequently used actions in a secondary UI screen, which is accessible through the "page curl" control displayed on the map. In some embodiments, the page curl is permanently displayed on at least some of the map views that the application provides. For instance, in some embodiments, the application displays the page curl permanently on the starting page (illustrated in second stage 110) that it provides for allowing a user to browse or search a location or to identify a route.

The page curl indicates the location of another set of controls that are conceptually "behind" the current view. When the page curl control 155 is selected, the application present an animation that "peels" off the current view to display another view that shows the other set of controls. The third stage 115 illustrates an example of such an animation. As shown by this stage, the "peeling" of the starting page reveals several controls, which in this example are the drop pin, print, show traffic, list, standard, satellite, and hybrid controls. In some embodiments, these controls perform the same operations as similar controls do in currently available smartphones, such as iPhones operating iOS®.

The use of the page curl allows the application to display more of the map while offering an unobtrusive way to access further functionality that is provided by the other set of controls. Additionally, in some embodiments, the application does not use the page curl in map views where the additional functionality is deemed to be inappropriate to the task at hand. For instance, in some embodiments, the application does not display this page curl while presenting the map view during navigation.

Also, the third stage 115 illustrates that the user drags a corner or an edge of the page to peel off the page in some embodiments. However, in other embodiments, the animation that peels off the page is displayed by simply tapping the page curl control 155 without dragging the corner or the edge.

B. Adaptive Button Cluster

Figure 2:
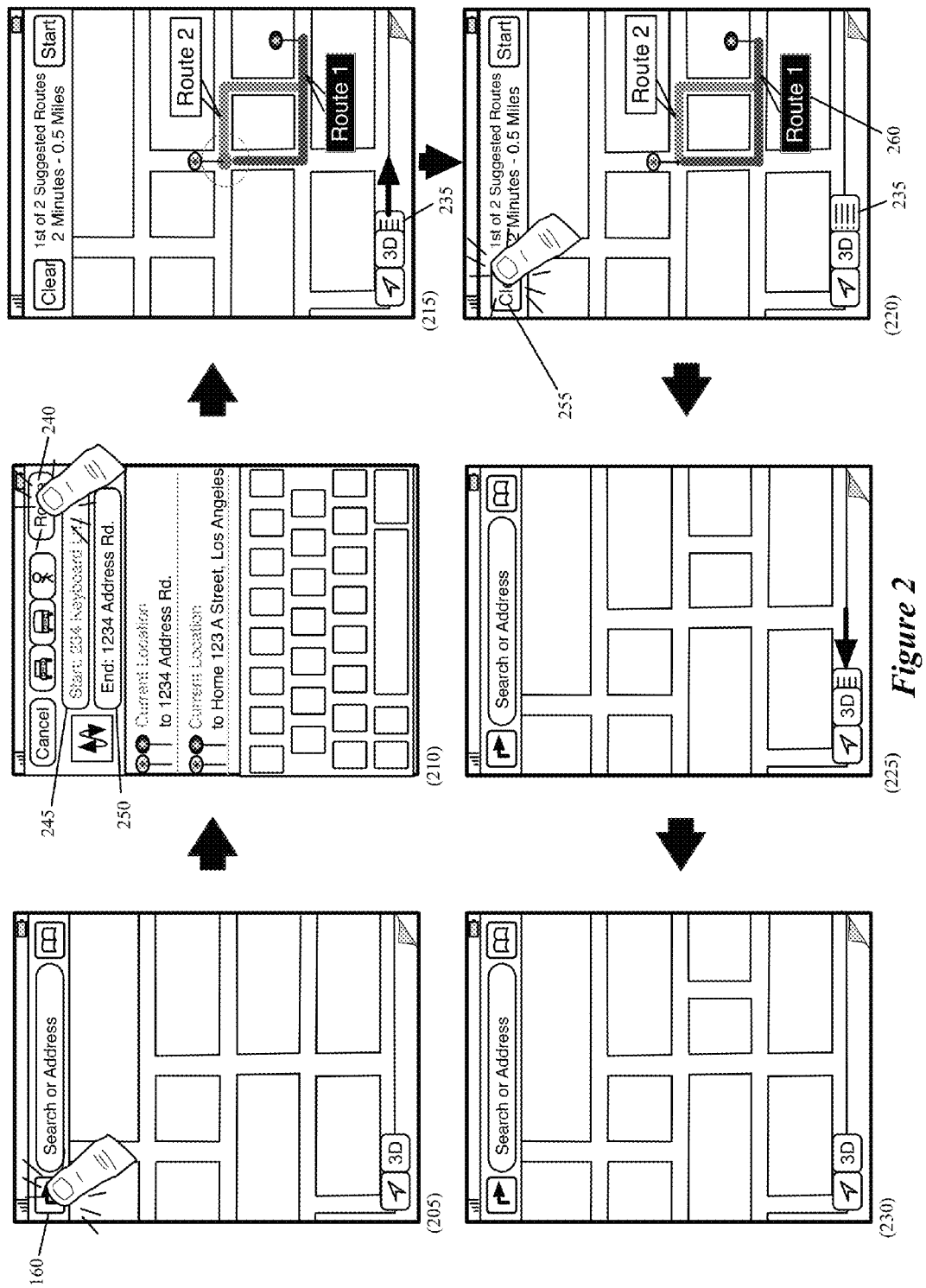
FIG. 2 conceptually illustrates an example of an integrated application adaptively modifying a floating control cluster according to some embodiments of the invention.

As mentioned above, the mapping application in some embodiments adaptively adds and removes controls to the floating control cluster set in order to adapt this cluster to the different tasks while maintaining a consistent look and interaction model between those tasks. FIG. 2 illustrates an example of the application adaptively modifying the floating control cluster to add and remove a list view control 235. This example is provided in the context of using the direction indicator 160 to obtain a route between two locations.

This example is also provided in terms of six stages 205-230 of interactions with the mapping application. The first stage 205 illustrates the selection of the direction indicator 160. The second stage 210 next illustrates the selection of a route generation control 240 after the user has entered starting and ending locations for the route in the starting and ending fields 245 and 250. The second stage 210 also shows that the mapping application is displaying several recently used route generation requests below the fields for entering the starting and ending locations.

The third stage 215 shows two routes 260 and 261 that the mapping application has identified for the provided starting and ending locations. In some embodiments, the mapping application highlights one of the routes to indicate that the highlighted route is a default route that the mapping application recommends. This stage also illustrate the start of an animation that shows the list view control 235 sliding out from under the 3D icon 150. When there are opportunities to display a list of items, be it a list of instructions in a route or a list of search results when multiple results are found for a given query, the mapping application of some embodiments displays a list control as one of the floating controls. Tapping the list control brings up a modal list view in some embodiments. Having a modal list view keeps the mapping application simple and the map front and center. In some embodiments, the list view itself is adapted and optimized for the type of list being displayed, in that search results will be displayed with star ratings when available and route steps will include instructional arrows.

The fourth stage 220 shows the selection of a clear control 255 to clear the identified routes 260 and 261 from the illustrated map. In response to this selection, the routes 260 and 261 are removed from the map and an animation starts to show the list control 235 sliding back under the 3D control 150, as illustrated in the fifth stage 225. The sixth stage 1230 shows the application UI after the animation has ended and the list control has been removed from the floating control set.

Figure 3:
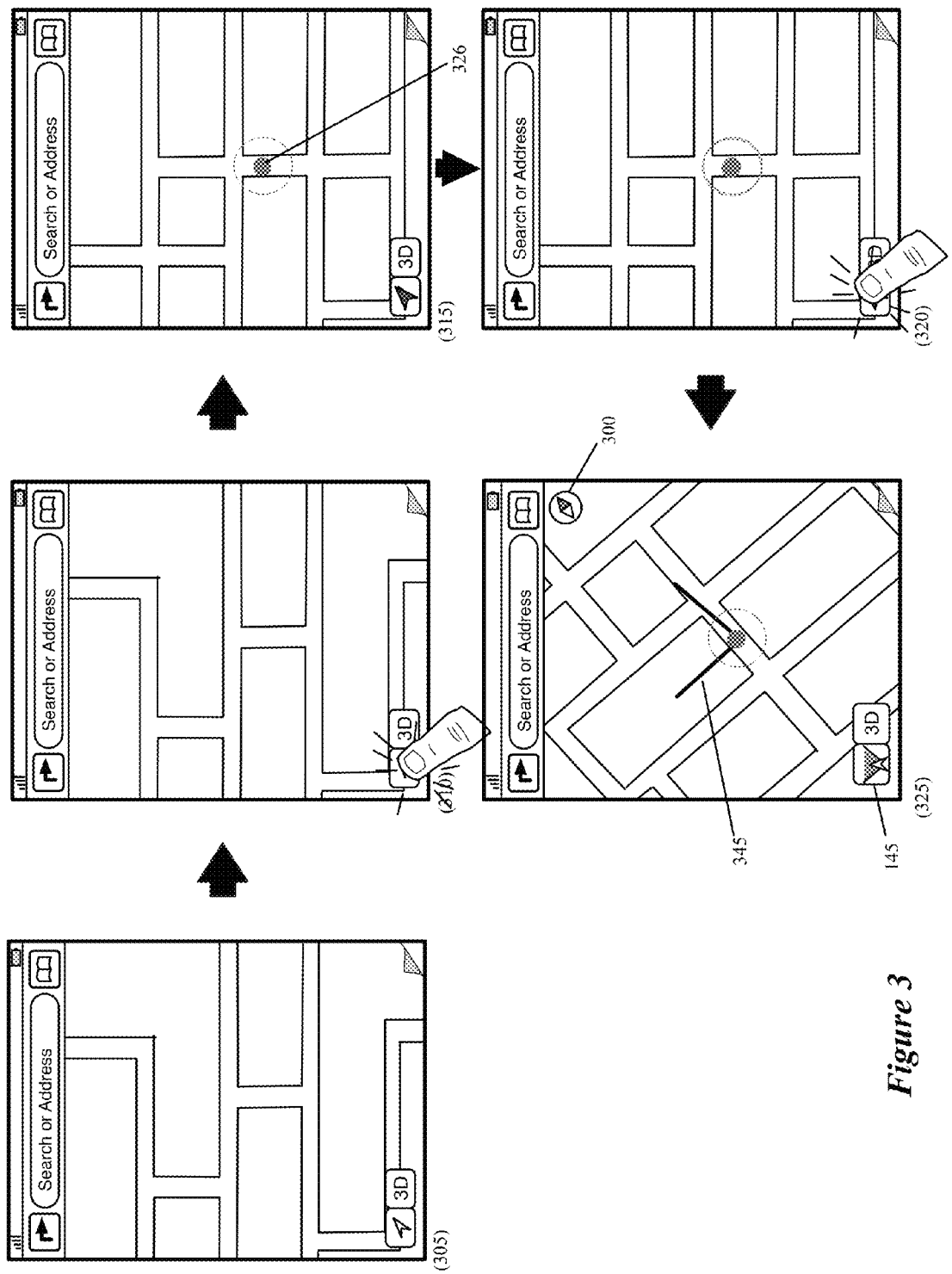
FIG. 3 conceptually illustrates an example of an integrated application adaptively modifying a floating control cluster according to some embodiments of the invention.

Another floating control that the mapping application of some embodiments employs is a compass. FIG. 3 illustrates an example of the application adaptively modifying the floating control cluster to add and remove a compass 300. This example is provided in the context of using the position control 145 to view the current position and orientation of the device on the map presented by the device. In some embodiments, the position control 145 can cause the mapping application to operate in three different states. For instance, when the position control 145 is not selected, the mapping application displays a map view. Upon receiving a first selection of the position control 145, the mapping application shifts the map to display a region of the map that includes the current location of the device in the center of the region. The mapping application of some embodiments, from then on, tracks the current location of the device as the device moves.

In some embodiments, the mapping application maintains the current location indicator in the center of the display area and shifts the map from one region to another as the device moves from one region to another region. Upon receiving a second selection of the position control 145 while the mapping application is maintaining the current location of the device in the center of the displayed region, the mapping application displays a simulated light projection in the map from the identified current position in the direction that the device currently faces. When the position control 145 is selected again while the mapping application is displaying a simulated light projection, the mapping application returns back to the state that was before receiving the first selection. That is, the projection will disappear and the current position of the device is not tracked.

The example illustrated in this figure is provided in terms of five stages 305-325 of interactions with the mapping application. The first stage 305 illustrates that the mapping application is displaying a map region that happens to not include the current location of the device (i.e., the current location indicator is not displayed in the map region).

The second stage 310 illustrates the position control 145 being selected once. As mentioned above, the first selection of the position control 145 will result in shifting the map to display a map region that has the current location indicator 326 in the center. The third stage 315 shows the result of selecting the position control 145. Some embodiments identify the device's current position by using the current location indicator 326. The current location indicator 326 has different appearances in different embodiments. For instance, the current location indicator 326 of some embodiments has appearance of a colored dot (e.g., a blue dot) on the map. Identification of the current position is useful when the user has explored (e.g., through gestural swipe operation) the displayed map such that the device is not currently displaying the user's current location on the map.

The fourth stage 320 illustrates the position control 145 being selected again. The second selection of the position control 145 in some embodiments will cause the application to display a simulated light projection 345 in the map from the identified current position 326 in the direction that the device currently faces. This projection helps the user identifies the direction that the device faces at any time. In some embodiments, this projection always points towards the top of the device (i.e., the location along which the search field 165 is positioned while the device is held in the portrait direction).

This projection 345 is illustrated in the fifth stage 310. This stage also shows that in this mode, the mapping application presents a floating compass 300. This compass serves as an indicator that the user can use to identify the direction to the North Pole. In some embodiments, this compass is in the shape of two isosceles triangles that abut at their bases, with one of the triangles pointing north (in a direction away from the abutting bases) and having a color (e.g., orange) that differentiates it from the other triangle. As further described below, the compass can also be use to restore a north-up orientation after the user has rotated a 2D or 3D view of the map. In some embodiments, the compass may remain in the map view after the mapping application receives another selection of the position control 145. In some embodiments, the compass will not disappear until the mapping application receives a user input to remove the compass (e.g., selection of the compass).

The fifth stage 325 also shows that the map has rotated to maintain the projection's direction to the top of the device. This is because the device has been facing a different direction than the direction to the top of the device in the previous stage 320. As the direction of the device moves, so will the direction of the compass 300 with respect to the top of the device. The compass has moved to indicate the device is facing a northwest direction.

In some embodiments, the mapping application changes the appearance of the position control 145 once after the first selection and another time after the second selection. The fifth stage 325 shows the appearance of the position control 145 after the second selection, which is different than the appearance of the position control 145 after the first selection.

C. 2D or 3D

The mapping application in some embodiments can display a location in the map in either a 2D mode or a 3D mode. It also allows the user to browse a location in the map in either a 2D mode or a 3D mode. As mentioned above, one of the floating controls is the 3D control 150 that allows a user to view a map or inspect a route in three dimensions (3D). This control also serves as (1) an indicator that the current view is a 3D view, and (2) an indicator that a 3D perspective is available for a given map view (e.g., a map view that is zoomed out might not have a 3D view available).

Figure 4:
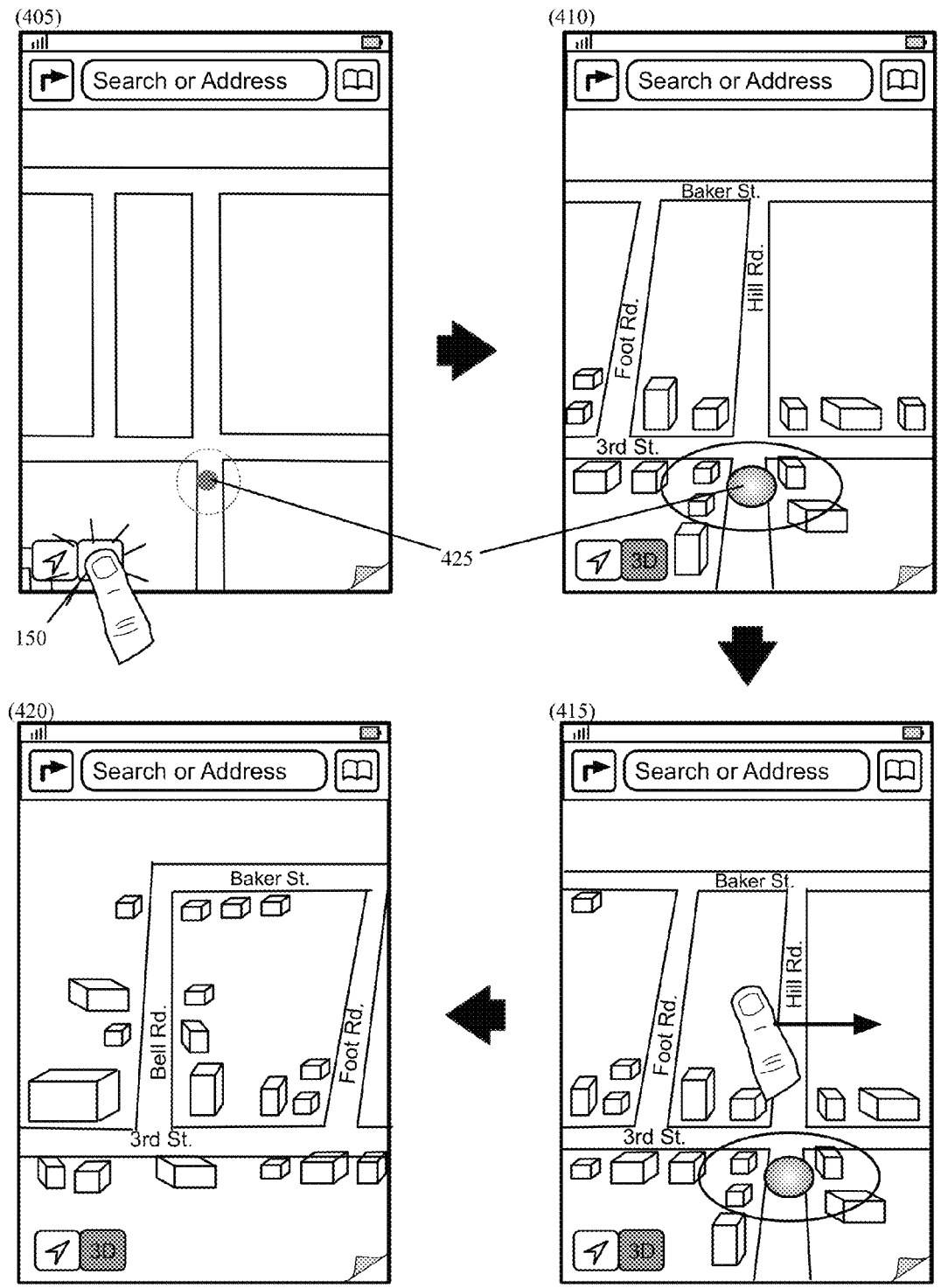
FIG. 4 conceptually illustrates how the mapping application of some embodiments provides a 3D control as a quick mechanism of entering a 3D mode for viewing a map location in three dimensions.

FIG. 4 illustrates how the mapping application of some embodiments provides the 3D control 150 as a quick mechanism of entering a 3D mode for viewing a map location in three dimensions. This figure illustrates this operation in four stages 405-420. The first stage 405 illustrates the user selecting the 3D control 150 while viewing a two-dimensional presentation of an area about the user's current location 425.

The top bar, the floating controls, and the page curl are not depicted in this figure for simplicity of description.

The second stage 410 shows a three dimensional presentation of the user's current location on the map. As mentioned above, the mapping application generates the 3D view of the map in some embodiments by rendering the map view from a particular position in the three dimensional scene that can be conceptually thought of as the position of a virtual camera that is capturing the map view.

The third stage 415 shows the user browsing about the current location by performing a swipe operation (e.g., by dragging a finger across the touch-sensitive screen of the device). This swipe operation changes the 3D map view presented on the device to display a new location on the 3D map. This new location is illustrated in the fourth stage 420.

In some embodiments, the mapping application presents the 3D view of the map while the mapping application is operating in a navigation mode (i.e., while the mapping application is presenting turn-by-turn navigation view). In order to provide visual distinction between the 3D view of the map during navigation and the 3D view of the map during map browsing, the mapping application of some embodiments use different stylesheets that define rendered graphics differently. For instance, the mapping application of some embodiments uses a stylesheet that defines grey colors for buildings, white colors for roads, and rounded corners for blocks in the 3D view of the map during map browsing. The mapping application of some embodiment uses a stylesheet that defines white colors for buildings, grey colors for roads, and sharp corners for blocks in the 3D view of the map during navigation. In some embodiments, the mapping application applies these stylesheets to the same map tiles for a given region of the map. In other embodiments, the mapping application applies these stylesheets to different map tiles (e.g., map tiles, navigation tiles, etc.) for the given region. Using stylesheets to render maps are further described in concurrently filed U.S. patent application Ser. No. 13/632,035, now published as U.S. Publication number 2013/0322702, entitled "Rendering Maps". U.S. patent application Ser. No. 13/632,035, now published as U.S. Publication number 2013/0322702, is incorporated herein by reference.

II. Location Search

The search field of the mapping application in some embodiments is another UI tool that the application employs to make the transition between the different modalities seamless. In some embodiments, a user can initiate a search by tapping in the search field. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote server suggestions. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term is a prefix of an address label (e.g., 'Wo' for 'Work'), the application presents the user's labeled address as a completion in the search table in some embodiments. Together these behaviors make the search UI a very powerful way to get results onto a map from a variety of sources. In addition to allowing a user to initiate a search, the presence of the search field in the primary map view in some embodiments also allows users to see the query corresponding to search results on the map and to remove those search results by clearing the query.

Figure 5:
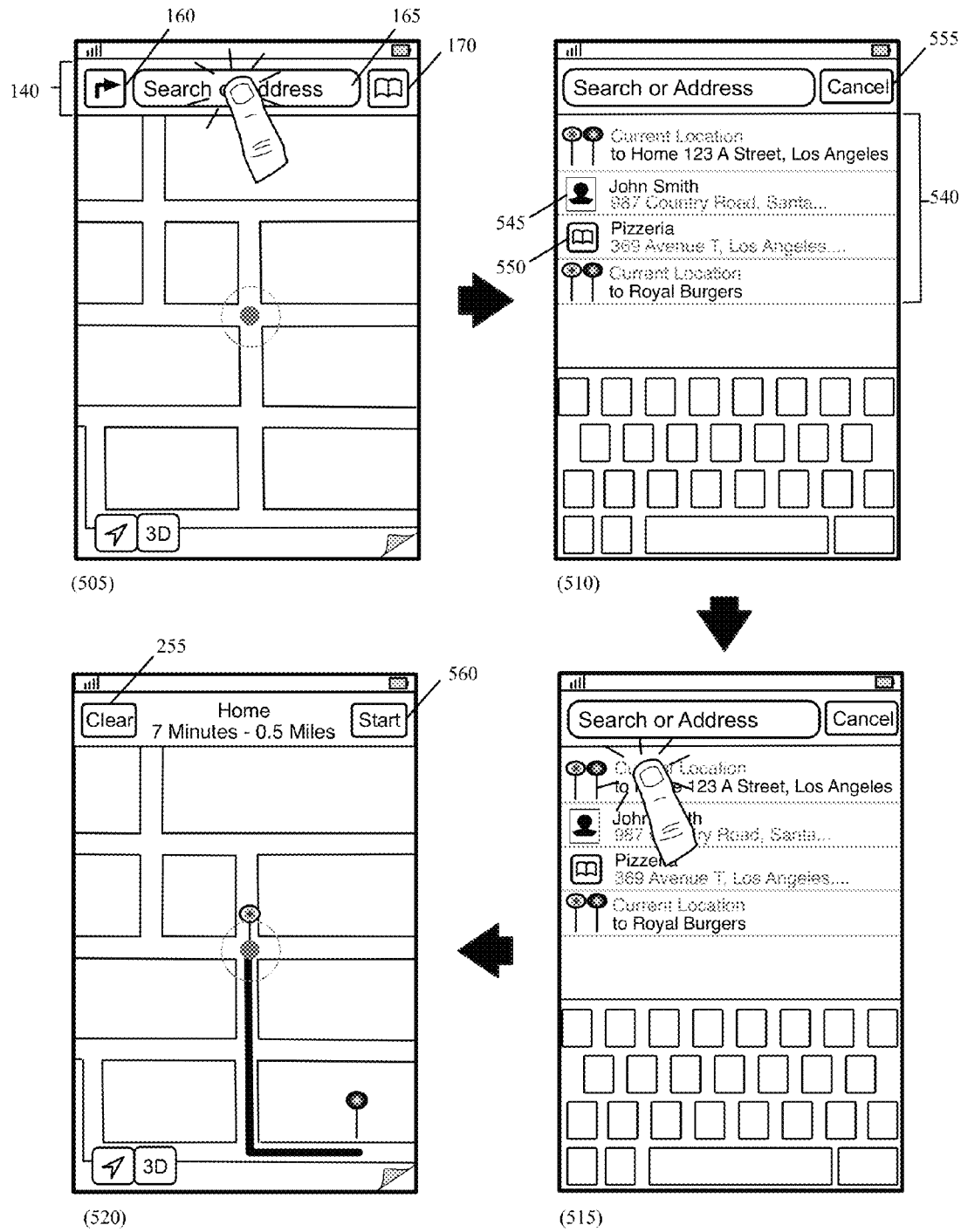
FIG. 5 conceptually illustrates a user's interaction with the application of some embodiments running on a user's device in order to display the search table with a list of the user's recent searches and recent route directions.

As described above, when the search field is initially tapped and before any search terms are provided or edited, or when the search field is empty, the search table displays a list of recent searched terms and searched route directions. FIG. 5 illustrates four stages 505-520 of a user's interaction with the application running on a user's device in order to display the search table with a list of the user's recent searches and recent route directions.

The first stage 505 shows the device after the mapping application has opened. As mentioned above, the mapping application's UI has a starting page that in some embodiments (1) displays a map of the current location of the device, and (2) several UI controls arranged in the top bar 140 and as floating controls. In the first stage 505, the user taps the search field 165, which is currently empty. The top bar 140 includes the direction control 160 and the bookmark control 170.

The second stage 510 illustrates the application displaying a search table 540 after receiving the user's tapping of the search field. This search table is displayed regardless of whether or not the user provides any search terms in the search field. The search table 540 provides a list of suggested search completions, including recently searched terms and route directions. In particular, the search table indicates that the user recently searched for "John Smith" and "Pizzeria." Each of the search completions listed in the search table also indicates certain other useful information. For instance, an icon 545 displayed next to "John Smith" indicates that this person is included in a contact list on the user's device and "Pizzeria" is currently saved as a bookmark, as indicated by a bookmark icon 550.

The search table also lists the user's recent route directions, which includes directions to "Royal Burgers" illustrated at the bottom of the search table 540. Also, the search table 540 lists an option to obtain directions from the user's current location to their home address, which is illustrated as the first item of the search table 540. When showing recents, a route from current location to the user's home is always offered in some embodiments. Moreover, the mapping application of some embodiments displays recent route directions only when the search field is empty. That is, once the user starts typing in a search query, the mapping application does not include recent route directions in the list of suggested search completions.

The second stage 510 also illustrates that the mapping application of some embodiments removes the direction control 160 and the bookmark control 170 from the top bar 140. The mapping application inserts a cancel control 555 for canceling out of the search table 540 and going back to the map view shown in the previous stage 505.

The third stage 515 illustrates the user's selection of the directions to "Home" option, listed as the first item in the search table. By providing some of the most frequently requested user searches and direction requests at the top of the search table, including a direction to home option, the application provides a user the ability to quickly obtain information for their most common requests without having to extensively navigate the application to receive these results.

The fourth stage 520 illustrates the mapping application displaying a route corresponding to directions from the user's current location to their home. The mapping application of some embodiments also removes the search field 165 and the cancel control 555 from the top bar 140 and places the clear control 255 and a start control 560. The start control 560 in some embodiments is for starting the navigation according to the selected route. In some embodiments, the mapping application centers the current location indicator in the display area so that the route from the current location is displayed from the center of the display area.

A user may also provide a search query in the search field. When the user enters a full search term in the search field, the mapping application of some embodiments provides a list of items that match or include the search term that has been typed in the search field so far. For each particular search, the user has the option to select from the list of items displayed in the search table or the user may select a "search" button on the keyboard to execute a full search of the search term as it relates to the map and the user's current location.

III. Route Generation

As mentioned above, the mapping application tightly integrates the search and route identification experience by providing several different ways to get directions. One such way is through a selectable direction UI control (e.g., button) on the main map view (e.g., in the top left corner), which when selected presents a modal interface for editing directions and that enables the user to request more customized routes, such as routes that do not begin from the current location or a walking route instead of just driving routes.

In some embodiments, the mapping application allows the user to inspect these customized routes by sliding the signs showing maneuver instructions in and out of the UI page showing a route. This mode of operation of the mapping application is referred to as a route inspection mode or (manual) stepping mode, which is one of several modes of operation in which the mapping application of some embodiments is capable of operating. Examples of these operational modes include a navigation mode, a map browsing mode, and the route inspection mode.

A juncture is where two or more road segments meet. A route is a path between a starting location and a destination location in the map. A typical route has zero or many junctures along the path between the two locations. A maneuver instruction for a juncture in the route identifies the direction of the road segment to advance from the juncture. In some embodiments, the mapping application provides the user with a maneuver instruction only for some of the junctures along the route because the user may not need to perform a maneuver at every juncture in the route in order to reach the destination location. For instance, the user carrying the device may recognize that the user only needs to go straight by passing through several junctures until the user reaches a juncture at which to make a turn to get to the destination location. In this patent application, when a juncture has a maneuver instruction to display, that maneuver instruction is referred to as a "step."

In the navigation mode, the mapping application of some embodiments provides the user with a set of steps for a route between the device's current location to a destination location. Typically, the mapping application provides the user with these steps visually and audibly in the navigation mode. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times. Also, the mapping application of some embodiments operating in the navigation mode displays the steps by "popping up" the step rather than sliding the steps in and out of the display area. Furthermore, the information in the step (i.e., the maneuver instruction) that the mapping application displays while operating in the navigation mode is dynamic in some embodiments. That is, information such as estimated time of arrival, remaining time of the trip to the destination location, remaining distance from the current location of the device to the destination location or the next juncture with next step, etc. get updated by the mapping application as the device is moving along the route.

In the route inspection mode, the mapping application of some embodiments allows the user to slide the steps in and out of the display area to inspect each step in the route. Alternatively, the mapping application allows the user to manipulate the map (e.g., by zooming in and out, sliding the map in different directions) to display different junctures in the route. When a juncture with a step is displayed in the display area as a result of the user's manipulation of the map, the mapping application displays the step by sliding in the step (and sliding in and out any intermediate steps between the previously displayed step and the currently displayed step). In this manner, the user can inspect the route by manually sliding the steps in and out of the display area or by manipulating the map to display certain junctures of the route in the display area.

Figure 6:
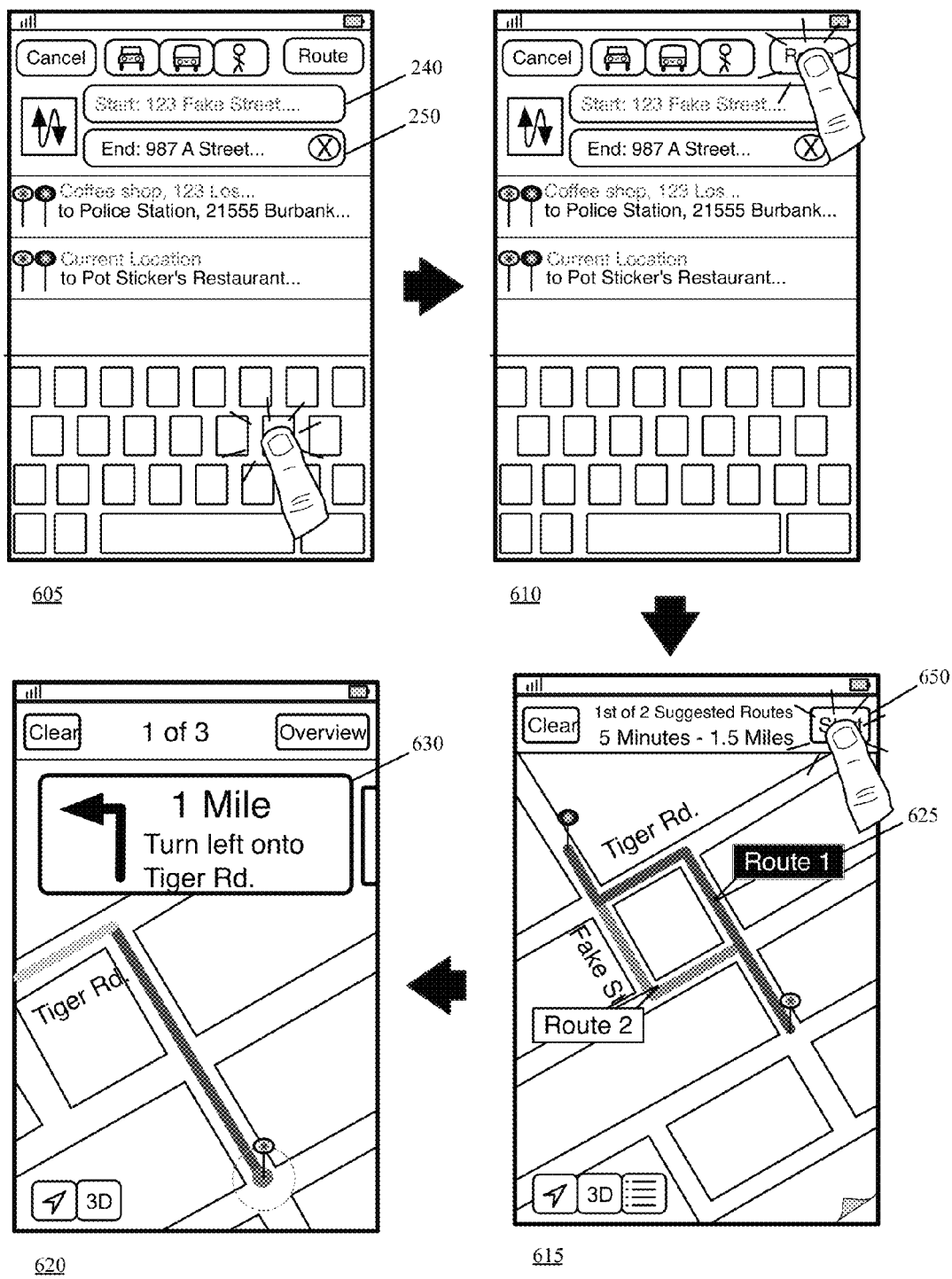
FIG. 6 conceptually illustrates an example of a user's interaction with the mapping application of some embodiments to obtain routing directions.

FIG. 6 illustrates an example in terms of four stages 605-620 of a user's interaction with the mapping application to obtain routing directions. Specifically, this figure illustrates that the mapping application starts to operate in the route inspection mode. The first stage 605 illustrates the device after the user has selected the direction control 160 (not shown in this figure). The first stage 605 also illustrates that the user has entered starting and ending locations for the route in the starting and ending fields 245 and 250.

The second stage 610 illustrates the selection of the route generation control 240. In some embodiments, when the route generation control is selected, the mapping application sends the starting and ending locations information to a remote server to obtain the routes. The third stage 615 shows two routes, route 1 and route 2 which the mapping application renders on the map based on the route information obtained from the remote server in some embodiments. The third stage 615 also illustrates that the mapping application has selected route 1 by default. The user selects the start control 650 for starting the navigation according to the selected route. The mapping application of some embodiments starts to operate in the route inspection mode upon receiving a selection of the start control 650.

The fourth stage 620 illustrates that the mapping application displays an instruction sign 630, which in some embodiments is the first sign of a series of turn-by-turn instruction signs (not all of them shown in the figure) for browsing the selected route. The mapping application allows the user to browse the selected route by sliding the signs along a particular axis (e.g., horizontally). These scrollable instruction signs are described in detail further below. In some embodiments, the mapping application allows the user to browse the selected route when the starting location of the selected route is not the user's current location. Also, the mapping application of some embodiments disables or does not display the page curl when the mapping application is in this mode for allowing the user to browse or inspect a selected route as shown in this stage 620.

Figure 7:
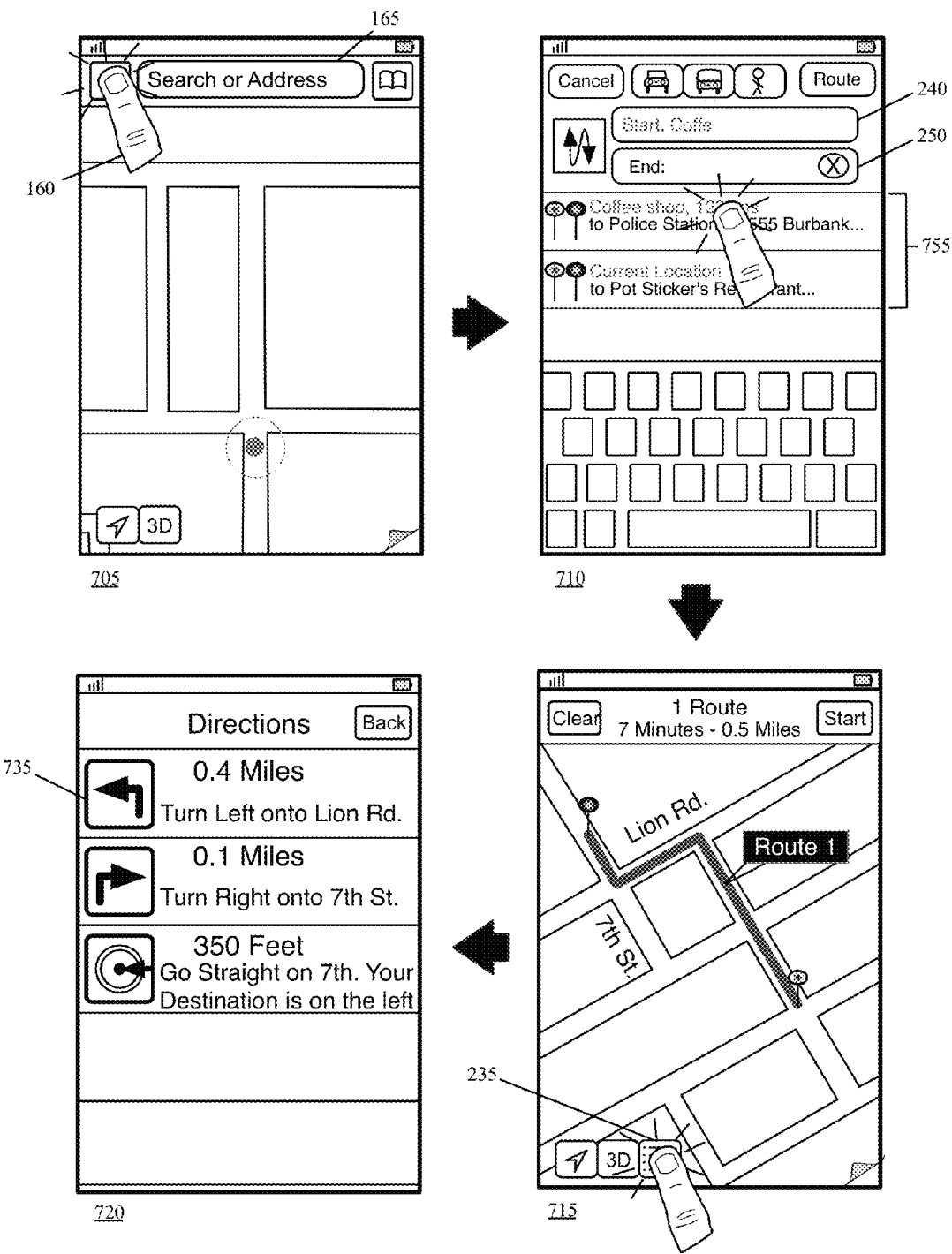
FIG. 7 conceptually illustrates an example of a user's interaction with the mapping application of some embodiments to obtain routing directions.

In addition to entering starting and ending locations for the route in the starting and ending fields 245 and 250, the mapping application of some embodiments allows the user to select a route from a list of previously searched routes. FIG. 7 illustrates an example in terms of four stages 705-720 of a user's interaction with the mapping application to obtain routing directions. This example is provided in the context of using the direction control 160 to obtain a route between two locations.

The first stage 705 illustrates the mapping application displaying a map of a street view of a city. The user is initiating a tap of the direction control 160 located at the top left corner of the display next to the search field 165. The second stage 710 next illustrates that the application presents a search table 755 with a list of recent route directions that the user has previously searched. In this example, the user selects a route to a police station as shown.

The third stage 715 illustrates the display of a map with the selected route between the device's current location to the destination for the selected route. This stage 715 also illustrates the selection of the list view control 235. The fourth stage 720 illustrates that the mapping application presents a list of turn-by-turn instructions to get to the destination. As shown, each instruction in the list includes a direction icon 735 that shows the directions for the particular turn associated with the instruction. In some embodiments, each instruction in the list looks identical to a corresponding instruction sign 635 described above by reference to FIG. 6.

The figures described above illustrate various features and operations of a mapping application in some embodiments. Additional details of mapping applications are described in concurrently filed U.S. patent application Ser. No. 13/632,102, now published as U.S. Publication number 2013/0326407, entitled "Problem Reporting in Maps"; and concurrently filed U.S. patent application Ser. No. 13/632,121, now published as U.S. Publication number 2013/0322634, entitled "Context Aware Voice Guidance". U.S. patent application Ser. Nos. 13/632,102, now published as U.S. Publication number 2013/0326407 and 13/632,121, now published as U.S. Publication number 2013/0322634, are incorporated herein by reference.

IV. Routing Applications

The above section describes various different ways to get directions provided by the mapping application. In some embodiments, the mapping application provides a feature that tightly integrates the mapping application with other third-party routing applications. This section will describe several examples and embodiments of such a feature.

Figure 8:
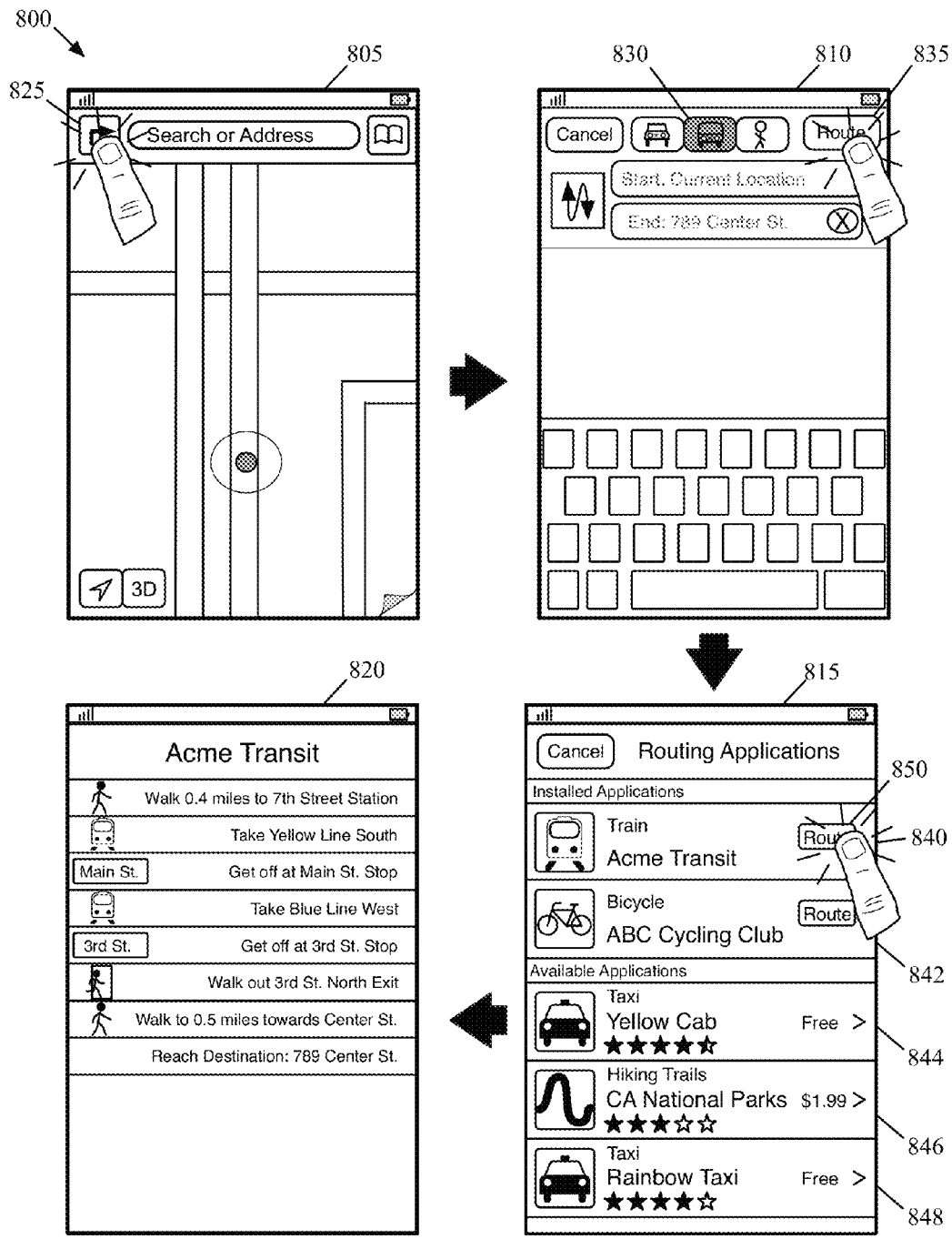
FIG. 8 conceptually illustrates an example of graphical user interface (GUI) of a mapping application of some embodiments that provides a third-party routing application feature.

FIG. 8 conceptually illustrates an example of graphical user interface (GUI) 800 of a mapping application of some embodiments that provides a third-party routing application feature. Specifically, FIG. 8 illustrates the GUI 800 at four different stage 805-820 of invoking the third-party routing application feature and selecting a third-party routing application.

The first stage 805 shows the GUI 800 displaying the location browsing interface of the mapping application. Additionally, the GUI 800 illustrates that a user is invoking the directions editing interface of the mapping application. As shown in the first stage 805, the user is selecting a selectable UI item 825 by tapping on the UI item 825 with a finger in order to invoke the directions editing interface. When the mapping application receives the selection of the UI item 825, the mapping application transitions to displaying the directions editing interface.

The second stage 810 illustrates the GUI 800 displaying the directions editing interface after the directions editing interface has been invoked. This stage also illustrates that the user has enabled a third-party routing application mode of the directions editing interface. In this example, the user enabled the third-party routing application mode by tapping on the selectable UI item 830 with a finger to select the UI item 830. When the mapping application receives the selection of the UI item 830, the mapping application displays a highlighting of the UI item 830 to indicate that the third-party routing application mode has been enabled. In this example, the user has specified the user's current location as the start location of route directions and "789 Center St." as the end location of the route directions.

In addition, the second stage 810 shows that the user is invoking the third-party routing application feature of the mapping application. As shown, the user is selecting the selectable UI item 835 by tapping on the UI item 835 with a finger in order to invoke the third-party routing application feature. When the mapping application receives the selection of the UI item 835 with the UI item 830 enabled, the mapping application transitions to displaying a third-party routing application interface.

In the third stage 815 shows the GUI 800 after the invocation of the third-party routing application feature of the mapping application. As illustrated, the GUI 800 in the third stage 815 is displaying the third-party routing application interface. The third-party routing application interface includes a section (the upper section in this example) for displaying a list of routing applications that are already installed on the device on which the mapping application is executing and another section (the lower section in this example) for displaying a list of routing applications that are available for installation on the device.

As shown in the third stage 815, the upper section of the third-party routing application interface is displaying graphic representations 840 and 842 of third-party routing applications that are already installed on the device. Each graphic representation includes an icon associated with a corresponding application, a description of the type of application (e.g., a train application, a bicycle application, a taxi application, a hiking trail application, etc.), the name of the application, and a selectable UI item (e.g., a Route button) for launching the application to provide route directions.

In addition, the application that corresponds to each of the graphic representations 840 and 842 is capable of providing route directions between the start and end locations specified in the second stage 810. In some embodiments, each of these applications is associated with a coverage file that specifies a geographic area in which the application is relevant. When the mapping application receives the invocation of the third-party routing application, the mapping application (1) identifies installed third-party routing applications with coverage files that specify geographical areas within which the start and end locations specified in the directions editing interface are included and (2) displays the identified, installed applications. Alternatively, the mapping application of some embodiments also identifies installed routing applications with coverage files that specify geographical areas within which one of the locations is included. In some such embodiments, the mapping application only identifies installed routing applications with coverage files that specify geographical areas (1) within which one of the locations is included and (2) from which the other location is within a defined distance.

In some embodiments, the mapping application ranks the identified, installed third-party routing application based on a set of factors and displays the applications in the ranked order. Examples of factors that may be considered include the popularity of the application (e.g., the number of downloads, ratings, rating score, etc.), the frequency in which local and/or remote users send route directions to the application, the size of the geographic area specified by the application's coverage file (e.g., large areas ranked lower), the distance of the current location of the user with respect to the geographic area specified by the application's coverage file, the user rating of the application, etc. In order to facilitate maintaining the frequency in which users send route directions to the application, the mapping application of some embodiments automatically sends data to a centralized location (e.g., a dedicated set of computing devices, one of the defined applications sources, etc.) for storage and processing.

At the third stage 815, the lower section of the third-party routing application interface is displaying graphic representations 844-848 of third-party routing applications that are available for installation on the device. Each graphic representation includes an icon associated with a corresponding application, a description of the type of application, the name of the application, a user rating of the application, a price to pay, if any, in order to install the application, and a selectable UI item (e.g., a right arrow) for displaying a product page associated with the application.

For this example, the application that corresponds to each of the graphic representations 844-848 is capable of providing route directions between the start and end locations specified in the second stage 810. In some embodiments, each of these applications is associated with a coverage file that specifies a geographic area in which the application is relevant. When the mapping application receives the invocation of the third-party routing application, the mapping application sends a set of requests for third-party routing applications to a set of defined application sources. In some embodiments, the requests specify the start and end locations.

The set of application sources may be defined to include any number of third-party application providers and/or hosts (e.g., online application stores, application distribution platforms, digital distribution services, etc.). In response to the mapping application's request, each application source identifies applications available through the application source for installation on the device in a similar manner as the mapping application, in some embodiments. That is, each application source (1) identifies installed third-party routing applications with coverage files that specify geographical areas within which the start and end locations specified in the directions editing interface are included and (2) displays the identified installed applications. Alternatively, each application source of some embodiments also identifies installed routing applications with coverage files that specify geographical areas within which one of the locations is included. In some such embodiments, the application source only identifies installed routing applications with coverage files that specify geographical areas (1) within which one of the locations is included and (2) from which the other location is within a defined distance.

When the mapping application receives search results from the set of application sources, the mapping application displays a list of the third-party routing application that are available for installation on the device. In some embodiments, the mapping application ranks the third-party routing application based on a set of factors and displays the applications in the ranked order. Examples of factors that may be considered include the popularity of the application (e.g., the number of downloads, ratings, rating score, etc.), the frequency in which local and/or remote users send route directions to the application, the size of the geographic area specified by the application's coverage file (e.g., large areas ranked lower), the distance of the current location of the user with respect to the geographic area specified by the application's coverage file, the user rating of the application, etc. In order to facilitate maintaining the frequency in which users send route directions to the application, the mapping application of some embodiments automatically sends data to a centralized location (e.g., a dedicated set of computing devices, one of the defined applications sources, etc.) for storage and processing.

In some embodiments, the mapping application manages its own dynamically-updated declaration of geographic coverage (e.g., a geographic region, a set of geographic points and/or locations, etc.). Based on the declaration of geographic coverage, the mapping application maintains a set of installed routing applications and available but not installed applications on-the-fly (e.g., by using the techniques described above). In some embodiments, the declaration of geographic coverage includes a portion or all of the geographic area that the mapping application is displaying (e.g., while performing location browsing, map searching, route identifying, and/or route navigating operations). This way, the mapping application can quickly provide a list of geographically relevant routing applications when the user invokes the third-party routing application feature.

The thirds stage 815 of the GUI 800 also shows that the user is selecting an installed routing application to provide route directions through the routing application. As illustrated, the user is selecting the selectable UI item 850 by tapping on the UI item 850 with a finger in order to launch the third-party routing application represented by the graphic representation 840. Upon receiving the selection of the UI item 850, the mapping application launches the Acme Transit application by sending route data to the application and transitioning to the Acme Transit application. As indicate by the graphic representation 840, the Acme Transit routing application is for providing train route directions. In some embodiments, the route data includes the start location and the end location specified in the directions editing interface shown in the second stage 810. The route data of some embodiments includes additional and/or other information, such as names associated with the start and end locations, phone numbers associate with the start and end locations, address book identifiers associated with the start and end locations that identify entries in an address book application installed on the device, etc.

The fourth stage 820 shows the GUI 800 after the Acme Transit routing application has processed the route data. At this stage 820, the Acme Transit routing application is displaying a list of route directions to travel by train. For this example, the Acme Transit routing application used the route data (the start location and the end location in this example) to provide route directions from the user's current location to "789 Center St." via train.

Figure 9:
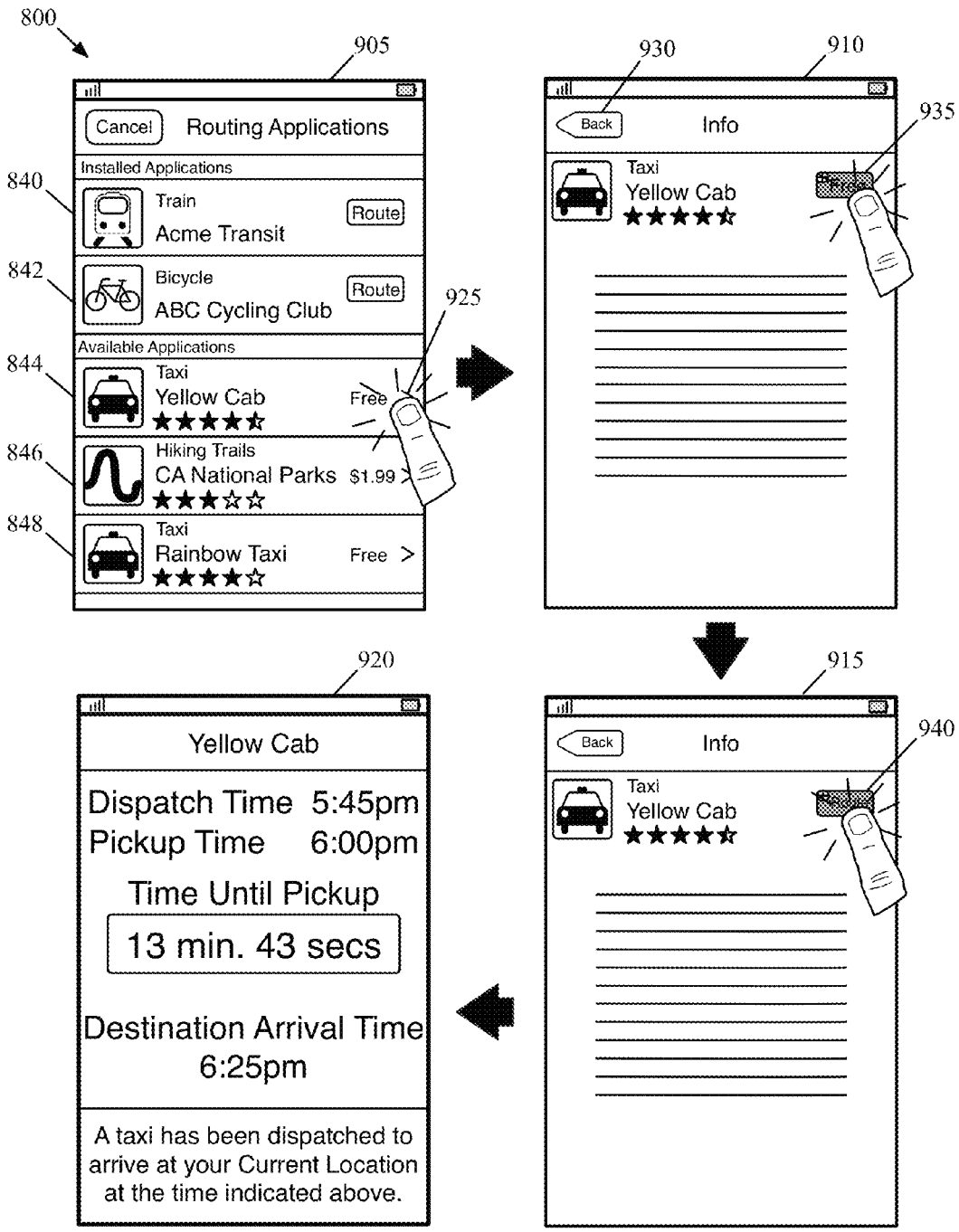
FIG. 9 conceptually illustrates an example of installing a third-party routing application and using the third-party routing application to provide route information.

FIG. 9 conceptually illustrates an example of selecting and installing a third-party routing application according to some embodiments of the invention. In particular, FIG. 9 illustrates the GUI 800 at different four different stages 905-920 of selecting and installing a third-party routing application.

The first stage 905 of the GUI 800 is similar to the third stage 815 of the GUI 800 described above by reference to FIG. 8 except the first stage 905 shows an available third-party routing application being selected instead of an installed third-party routing application. As shown in the first stage 905, the GUI 800 is displaying the third-party routing application interface. Here, the user is selecting a routing application that is not installed on the device but is available for installation. Specifically, the user is selecting a selectable UI item 925 by tapping on the UI item 925 with a finger in order to transition to a product page associated with a routing application (the Yellow Cab routing application in this example) represented by the graphic representation 844. When the mapping application receives the selection of the UI item 925, the mapping application displays the product page associated with the Yellow Cab routing application. In some embodiments, the mapping application displays the product page by retrieving the page from the application source that provides and/or hosts the routing application.

The second stage 910 illustrates the GUI 800 after the mapping application transitions to the Yellow Cab routing application's product page. As shown, the product page includes a selectable UI item 930 for transitioning back to the third-party routing application interface illustrated in the first stage 905, an icon associated with the Yellow Cab routing application, a description of the type of application, the name of the application (Yellow Cab in this example), a user rating of the application (4.5 stars in this example), a price to pay (free in this example) in order to install the application, a selectable UI item 935 (e.g., a Free button) for installing the application on the device from within the mapping application, and a description of the application (indicated by a series of horizontal lines in this example). In some embodiments, the product page of an application includes additional and/or different information about the application. For instance, the produce page of some routing applications includes screenshot photos of the application, a file size of the application, a release date of the application, the creator(s) of the application, user reviews of the application, etc.

The second stage 910 also shows that the user is selecting a selectable UI item 935 by tapping on the UI item 935 with a finger to initiate installation of the Yellow Cab routing application. Upon receiving the selection of the UI item 935, the mapping application of some embodiments installs the Yellow Cab routing application on the device, removes the UI item 935, and displays in place of the UI item 935 a selectable UI item 940 for launching the application to provide route directions.

The third stage 915 shows the GUI 800 after the mapping application has installed the Yellow Cab routing application on the device. As shown, the GUI 800 is still displaying the product page except the UI item 940 is displayed instead of the UI item 935. In the third stage 915, the user is selecting the UI item 940 by tapping on the UI item 940 with a finger in order to launch the installed Yellow Cab routing application.

Upon receiving the selection of the UI item 940, the mapping application launches the Yellow Cab application by sending route data to the application and transitioning to the Yellow Cab application. As indicate by the product page of the Yellow Cab routing application, the application is for providing taxi route directions. As noted above, the route data includes the start location and the end location specified in the directions editing interface shown in the second stage 810, in some embodiments. The route data may include additional and/or other information, such as names associated with the start and end locations, phone numbers associate with the start and end locations, address book identifiers associated with the start and end locations that identify entries in an address book application installed on the device, etc., in other embodiments.

The fourth stage 920 shows the GUI 800 after the mapping application has launched the Yellow Cab routing application and the Yellow Cab routing application has processed the route data. As shown, the Yellow Cab routing application is displaying a time that a taxi was dispatched to the user's current location, a time when the taxi is to pick up the user, a remaining amount of time until the pickup, a time when the user is to arrive at "789 Center St.", and a message informing the user that a taxi has been dispatched to the user's current location. For this example, the Yellow Cab routing application used the route data (the start location and the end location in this example) to dispatch a taxi to the user's current location, determine the taxi's pickup time, calculate the remaining amount of time until the pickup time, and determine a destination arrival time to "789 Center St." by taxi.

Figure 10:
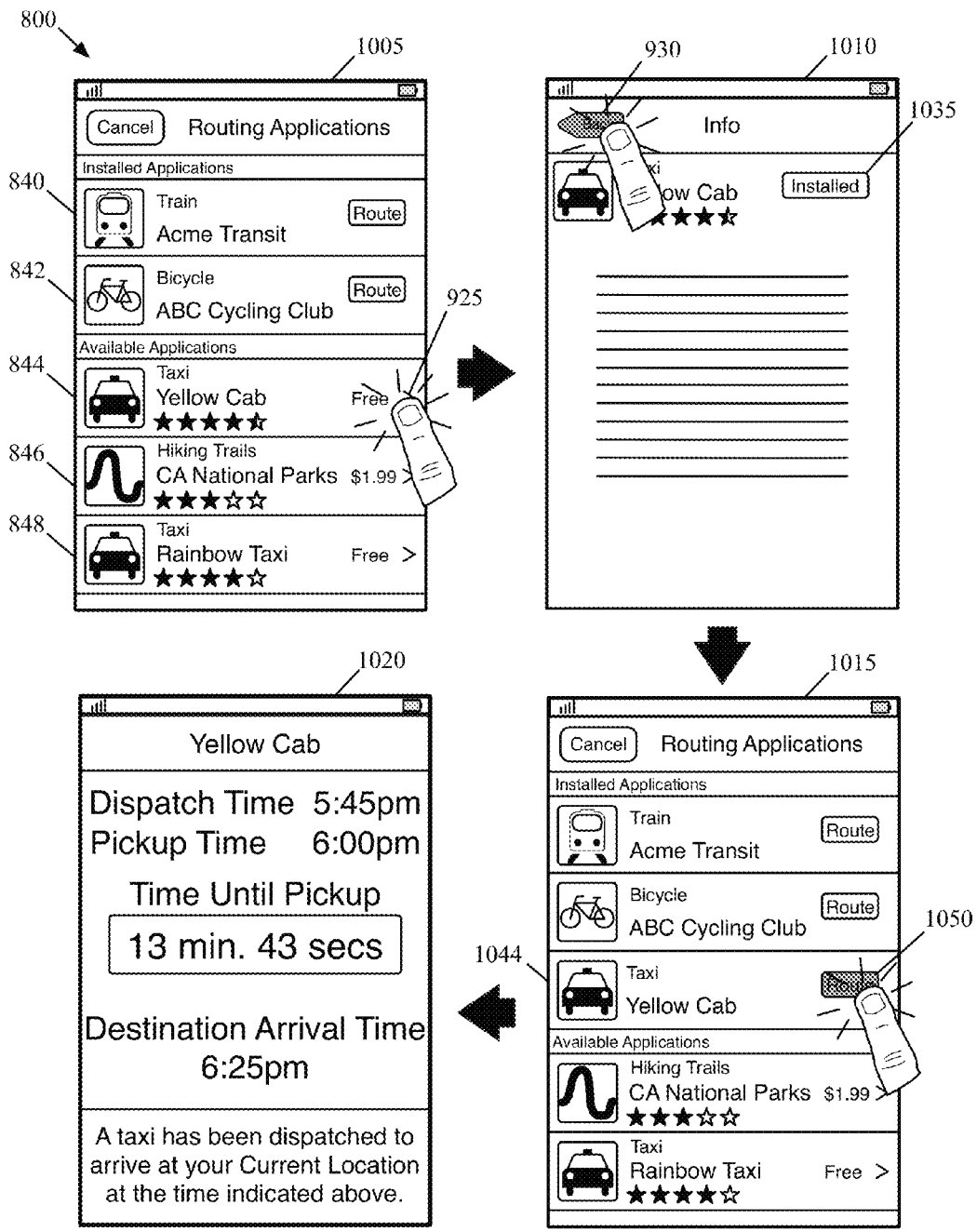
FIG. 10 conceptually illustrates another example of installing a third-party routing application and using the third-party routing application to provide route information.

The example illustrated in FIG. 9 shows a user launching a newly installed application directly from the application's product page. The mapping application of some embodiments does not allow the user to launch a newly installed third-party routing application from the application's product page (e.g., by not displaying the selectable UI item 940 after the mapping application installs the routing application). Rather, in some such embodiments, the user is required to navigate back to the third-party routing application interface, and then select in the application's graphic representation in order to launch the application. FIG. 10 conceptually illustrates an example of such installing a third-party routing application and using the third-party routing application to provide route information. In particular, FIG. 10 illustrates the GUI 800 at four different stages 1005-1020 of selecting, installing, and launching a third-party routing application.

The first stage 1005 of the GUI 800 is the same as the first stage 905 of the GUI 800 described above by reference to FIG. 9. That is, the user is selecting the UI item 925 in order to transition to the Yellow Cab routing application's product page. When the mapping application receives the selection of the UI item 925, the mapping application displays the product page associated with the Yellow Cab routing application (e.g., by retrieving the page from the application source that provides and/or hosts the routing application).

The second stage 1010 illustrates the GUI 800 after the mapping application transitioned to the Yellow Cab routing application's product page, the user initiated installation of the Yellow Cab routing application (e.g., by selecting the UI item 935), and the mapping application installed the Yellow Cab routing application on the device in response to the user's input. As shown, the GUI 800 is displaying a UI item 1035 to indicate that the Yellow Cab routing application is installed.

The second stage 1010 also shows that the user is selecting a selectable UI item 930 by tapping on the UI item 930 with a finger to transition back to the third-party routing application interface illustrated in the first stage 1005. Upon receiving the selection of the UI item 930, the mapping application of some embodiments displays the third-party routing application page illustrated in the first stage 1005.

In the third stage 1015, the GUI 800 shows the third-party routing application page that is to the one illustrated in the first stage 1005 except the Yellow Cab routing application is now displayed in the section (the upper section in this example) for displaying the list of routing applications that are already installed on the device on which the mapping application is executing as the mapping application installed the application in the second stage 1010.

The third stage 1015 also illustrates that the user is selecting a selectable UI item 1050 by tapping on the UI item 1050 with a finger to launch the installed Yellow Cab routing application. When the mapping application receives the selection of the UI item 1050, the mapping application launches the Yellow Cab application by sending route data to the application and transitioning to the Yellow Cab application in a similar manner as that described above by reference to FIG. 9.

The fourth stage 1020 is the same as the fourth stage 920 described above by reference to FIG. 9. That is, the stage 1020 shows the GUI 800 after the mapping application has launched the Yellow Cab routing application and the Yellow Cab routing application has processed the route data. In this example, the same route data is used to launch the Yellow Cab routing application as the route data described above by reference to the fourth stage 920 of FIG. 9. As such, the Yellow Cab routing application is displaying in the fourth stage 1020 a time that a taxi was dispatched to the user's current location, a time when the taxi is to pick up the user, a remaining amount of time until the pickup, a time when the user is to arrive at "789 Center St.", and a message informing the user that a taxi has been dispatched to the user's current location.

FIGS. 8-10 illustrate examples of different third-party applications presenting different information based on the route data in different fashions. One of ordinary skill in the art will realize that a third-party application can use the route data in any number of different ways to present any number of different data in any number of different manners. Alternatively, or in conjunction with route directions, the third-party routing application of some embodiments provides information other than route directions (e.g., regional advertisements, news, weather, etc.).

In addition, FIGS. 8-10 show route directions provided by third-party routing applications based on start and end locations specified by the user through the directions editing interface. In some embodiments, the user specifies route data provided from map search results that may contain sensitive data (e.g., device location). The mapping application of some embodiments provides a security feature that redacts data that is defined as sensitive data from such route data before sending the route data to a third-party routing application. In some embodiments, the security feature is implemented as a set of application programming interfaces (APIs).

Figure 11:
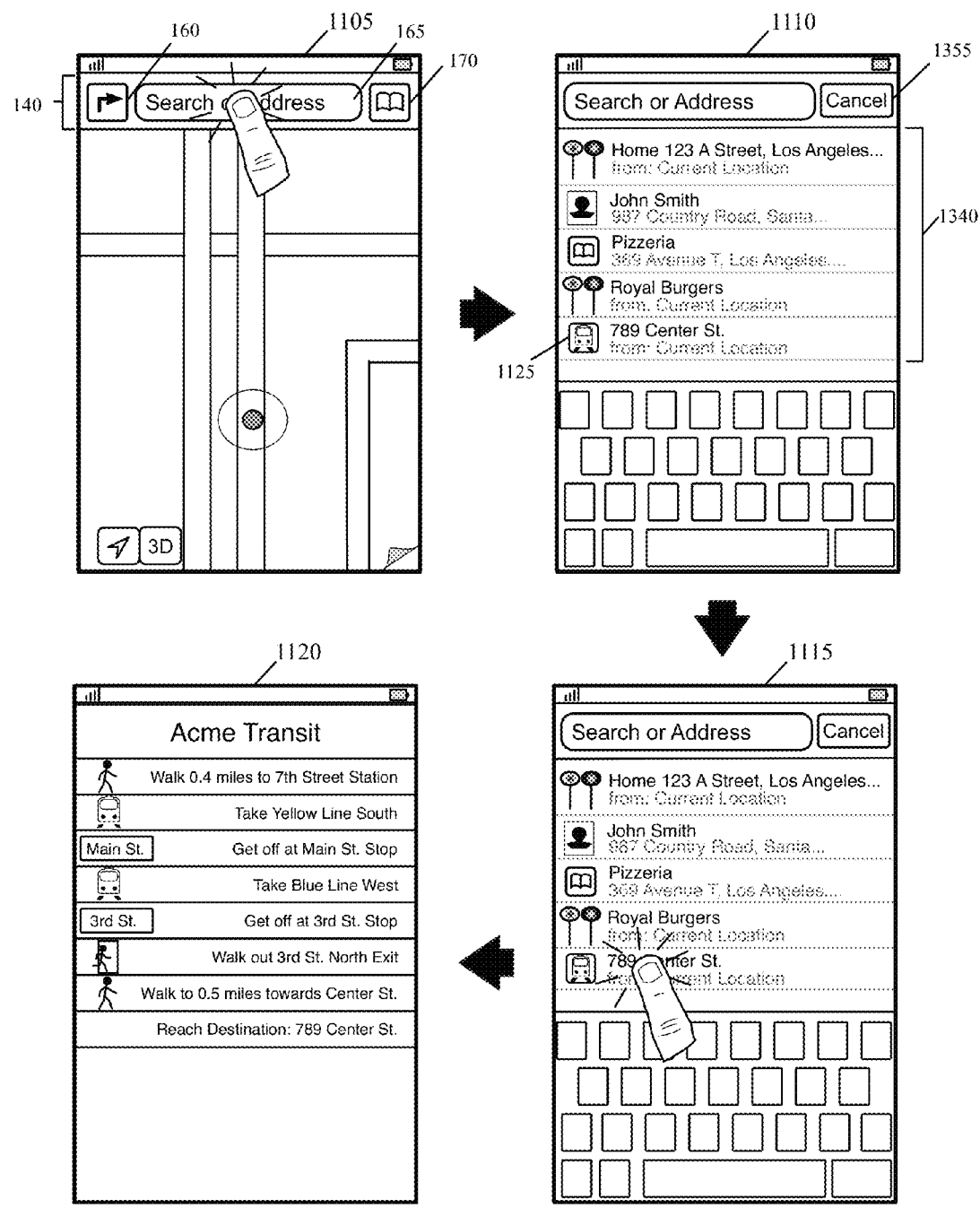
FIG. 11 conceptually illustrates an example of a user's interaction with the application of some embodiments to display a search table with a list of the user's recent searches and recent route directions.

As described above, when a user initially taps the search field and before the user provides or edits any search terms, or when the search field is empty, the mapping application of some embodiments displays a search table that includes a list of recent searched terms and searched route directions. In some embodiments, the search table also includes recent route directions used by third-party routing applications. FIG. 11 conceptually illustrates four stage 1105-1120 of a user's interaction with the application of some embodiments to display a search table with a list of the user's recent searches and recent route directions.

The first stage 1105 is similar to the first stage 505 described above by reference to FIG. 5. That is, the first stage 1105 shows the device after the mapping application has opened and the user is tapping the search field 165.

The second stage 1110 is similar the to second stage 510 described above by reference to FIG. 5 except the search table 540 in the second stage 1110 includes a recent route direction used by a third-party routing application. As shown, the search table indicates that the mapping application recently provided a third-party routing application (as indicated by icon 1125) with a route direction from the Current Location to "789 Center St.". In this example, the route direction corresponds to the route direction sent to the Acme Transit application 840 illustrated in FIG. 8.

The third stage 1115 illustrates the user's selection of the directions to "789 Center St." option, listed as the last item in the search table. By providing this option in the search table, the mapping application provides the user the ability to quickly obtain information for recent third-party routing application route direction information without having to extensively navigate the application to receive these results.

The fourth stage 1120 illustrates the mapping application displaying a route corresponding to directions from the user's current location to "789 Center St.", which is the same route direction illustrated in FIG. 8. As shown, the Acme Transit routing application is displaying the same list of route directions as that illustrated in the fourth stage 820 of FIG. 8.

Figure 12:
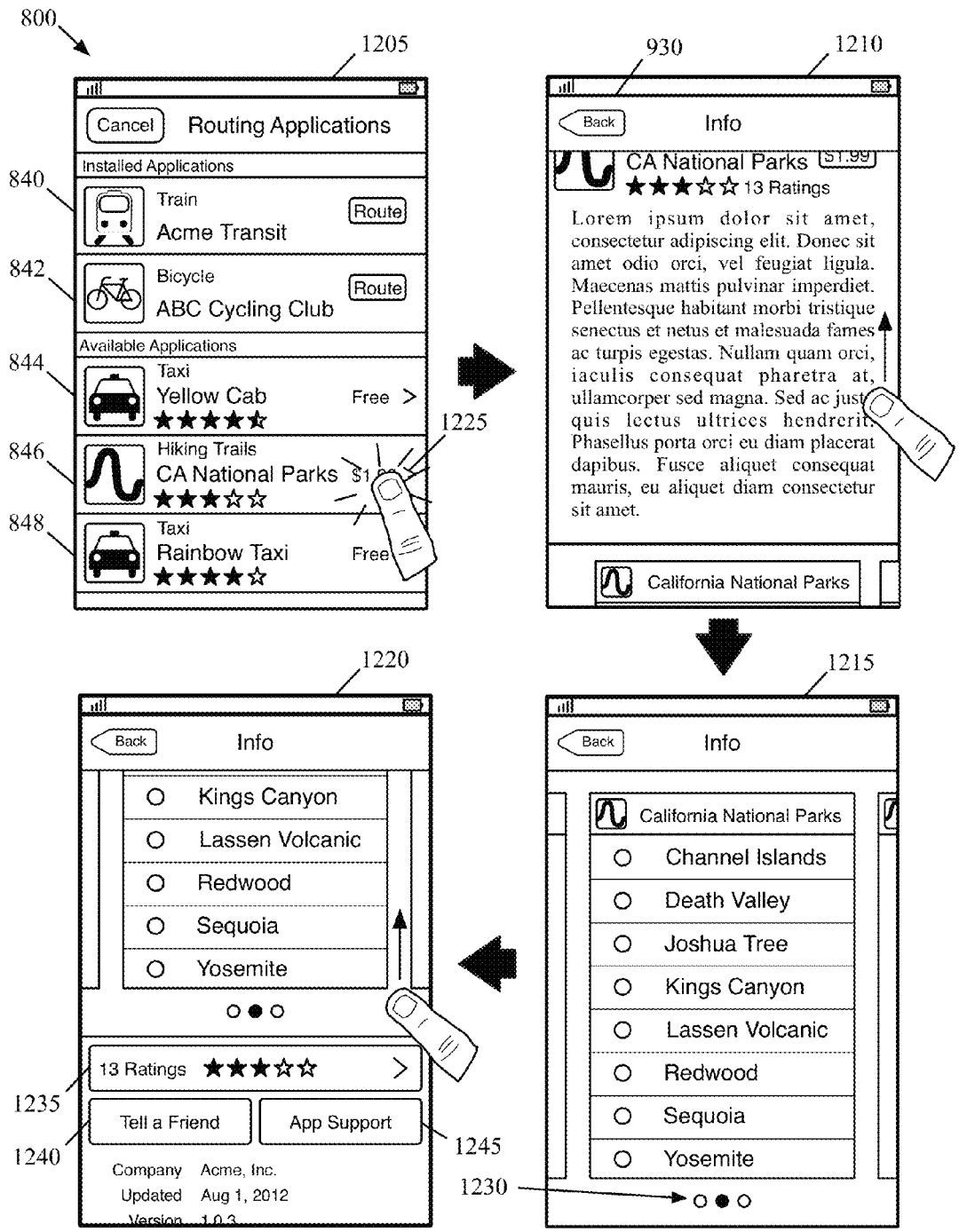
FIG. 12 conceptually illustrates an example of browsing a product page of an available third-party routing application according to some embodiments of the invention.

As mentioned above, the product pages of different third-party applications include a variety of different information to provide the user with details about the applications. FIG. 12 conceptually illustrates an example of browsing a product page of an available third-party routing application according to some embodiments of the invention. In particular, FIG. 12 illustrates the GUI 800 at four different stages 1205-1220 of browsing a product page of an available third-party routing application according to some embodiments.

The first stage 1205 of the GUI 800 is similar to the first stage 905 of the GUI 800 described above by reference to FIG. 9. That is, the first stage 1205 shows an available third-party routing application being selected. In this example, the user is selecting the graphic representation available third-party routing application 846 by tapping on a UI item 1225 with a finger in order to transition to a product page associated with a routing application (the CA National Parks routing application in this example) represented by the graphic representation 846. When the mapping application receives the selection of the UI item 1225, the mapping application of some embodiments displays the product page associated with the CA National Parks routing application. In some embodiments, the mapping application displays the product page by retrieving the page from the application source that provides and/or hosts the routing application.

In the second stage 1210, the user is browsing through a textual description of a third-party routing application' product page. In some embodiments, the textual description of a routing application includes any number of different pieces of information related to the routing application. Examples of information include a summary of the application, features of the application, bug fixes included since the last release of the application, contact information for technical support, testimonials from users of the application, etc.

As shown in the second stage 1210, the user is scrolling through the product page of the routing application 846 by touching a display area of the product page with a finger while moving the finger along an upwards direction, as indicated by an arrow. When the mapping application receives the touch and move input (e.g., a swipe gesture), the mapping application in some embodiments displays the routing application 846's product page scrolling down.

The third stage 1215 shows the GUI 800 displaying photos included in a product page of a third-party routing application. Different embodiments provide differently layouts of information included in a third-party routing application's product page. For instance, in this example, the application 846's product page includes a textual description near the top of the product page followed by several photos related to the application 846. Finally, the bottom of the application 846's product page includes various other information associated with the application 846.

For this example, once the user scrolls the product page such that the section that contains the photos is substantially or entirely within view through a screen of a device on which the mapping application is executing, the mapping application allows the user to browse through the photos. Here, the photos associated with the routing application 846 are arranged in a horizontal manner. As such, the user must provide input to scroll horizontally (e.g., horizontal swipe gestures) in order to browse through the application 846's photos. As shown at the third stage 1215, the routing application 846's product page includes three photos, as indicated by a set of three page indicators 1230. In particular, the GUI 800 is displaying the second photo, as indicated by a highlighting of the second page indicator in the set of page indicators 1230.

In the fourth stage 1220, the GUI 800 is displaying a portion of the bottom of a routing application's product page. At the fourth stage 1220, the user is scrolling through towards the bottom of the routing application 846's product page by touching the display area of the product page with a finger while moving the finger along an upwards direction, as indicated by an arrow. When the mapping application receives the touch and move input (e.g., a swipe gesture), the mapping application in some embodiments displays the routing application 846's product page scrolling down.

As noted above, the product page of a third-party routing application of some embodiments includes various additional information related to the application. In this example, the routing application 846's product page at the bottom includes the name of the company that developed the routing application 846, the date the application 846 was last updated, and the application 846's current version number. Additionally, the routing application 846's product page includes a selectable UI item 1235 for transitioning to a page that displays reviews and ratings for the application 846, a selectable UI item 1240 for notifying (e.g., via email, short message service (SMS) messaging, Twitter®, Facebook®, etc.) an individual about the application 846, and a selectable UI item 1245 for accessing support for the application 846.

The above-described FIG. 12 illustrates one example of information included in a third-party routing application's product page. One of ordinary skill in the art will understand that a routing application's product page may contain an infinite number of additional and/or different information related to the application. Often, the developers of many third-party applications choose the particular details (e.g., features, photos, compatibility requirements, support, etc.) about the applications along with the application itself to provide to an application source for hosting on the application source.

In addition, FIG. 12 shows a feature of the mapping application of some embodiments that provides details of available third-party routing applications by tightly integrating with and providing through the mapping application information specified for available third-party applications. In this fashion, a user of the mapping application of some embodiments may browse an application's product page within the mapping application when the user might want to learn about an available third-party application (e.g., the purpose of the application, the features of by the application, etc.) before deciding whether to install the application for use with the mapping application.

Figure 13:
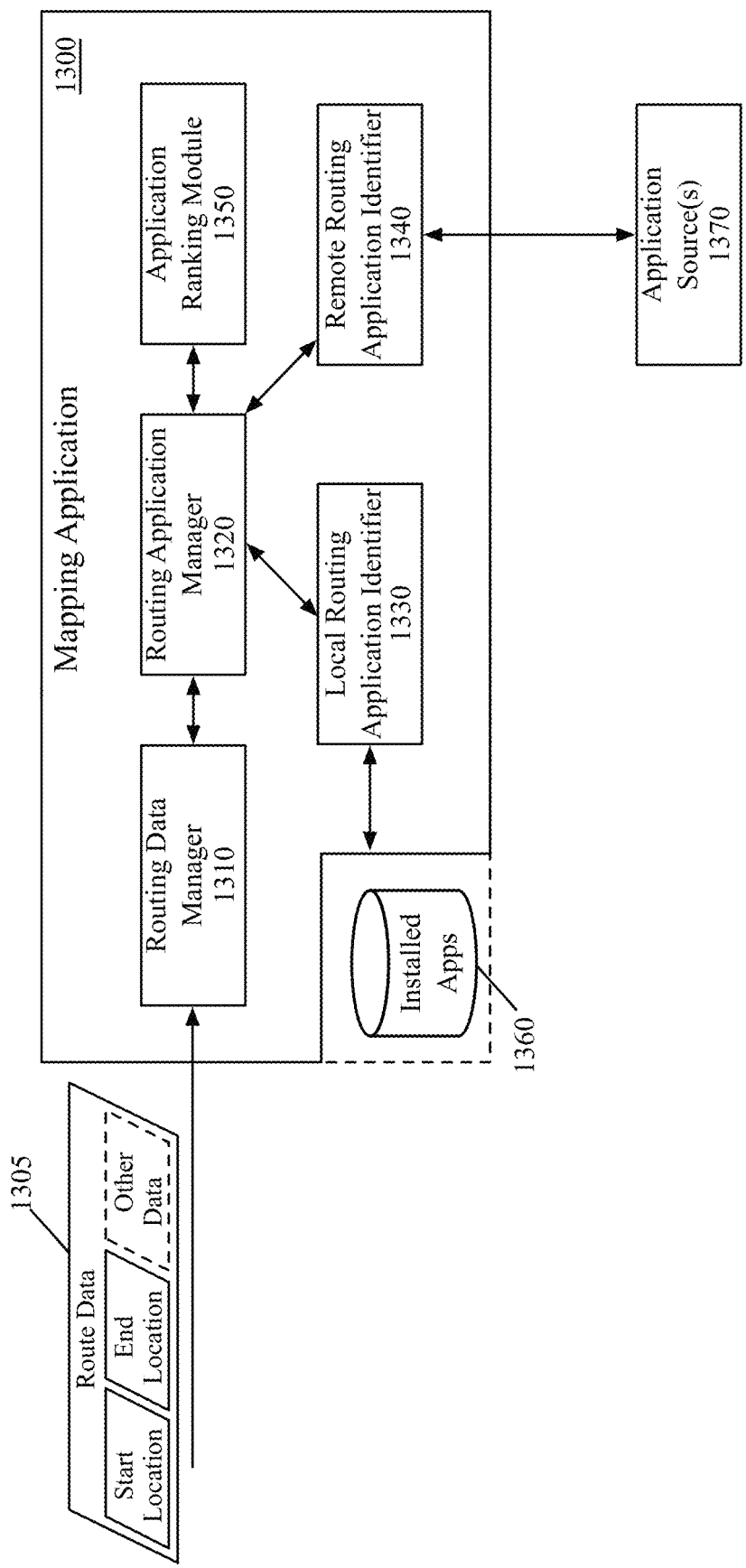
FIG. 13 conceptually illustrates a software architecture of a mapping application of some embodiments.

FIG. 13 conceptually illustrates a software architecture of a mapping application 1300 of some embodiments that provides a third-party routing application feature. In some embodiments, the mapping application 1300 is a stand-alone application or is integrated into another application, while in other embodiments the mapping application 1300 might be implemented within an operating system. Furthermore, in some embodiments, the mapping application 1300 is provided as part of a server-based solution. In some such embodiments, the mapping application 1300 is provided via a thin client. That is, the mapping application 1300 runs on a server while a user interacts with the mapping application 1300 via a separate machine remote from the server. In other such embodiments, the mapping application 1300 is provided via a thick client. That is, the mapping application 1300 is distributed from the server to the client machine and runs on the client machine.

As shown, the mapping application 1300 includes routing data manager 1310, routing application manager 1320, local routing application identifier 1330, remote routing application identifier 1340, and application ranking module 1350. The mapping application 1300 also includes installed applications storage 1360. The installed application storage 1360 stores applications (e.g., games, image editing applications, streaming video applications, etc.) that are native to the device on which the application 1300 runs and/or applications that a user installs on the device. In some embodiments, the installed applications storage 1360 is stored in one physical storage while, in other embodiments, the installed applications storage 1360 is stored on several separate physical stores.

The routing data manager 1310 is responsible for handling route data for route directions. In some embodiments, the routing data manager 1310 receives the route data from a user of the mapping application 1300 in a similar manner illustrated several of the above described figures (e.g., FIGS. 2, 5, and 6-8). The routing data manager 1310 of some embodiments translates, converts, modifies, and/or redacts data from the route data. For instance, for security purposes, the routing data manager 1310 redacts data that is defined as sensitive data from the route data before sending the route data to the routing application manager 1320.

Based on route data received from the routing data manager 1310, the routing application manager 1320 handles operations for providing appropriate routing applications to the user. The routing application manager 1320 ensures that routing applications are identified and ranked for the mapping application 1300 to provide to the user.

The local routing application identifier 1330 identifies third-party routing applications that are installed on the device by accessing the installed applications storage 1360. In some embodiments, the local routing application identifier 1330 identifies installed third-party routing applications that are defined for the area along and/or around a route specified by the route data. The local routing application identifier 1330 of some embodiments receives from the routing application manager 1320 a list of third-party routing applications that are defined for the area along and/or around a route specified by the route data and identifies the routing applications in the list that are installed on the device.

The remote routing application identifier 1340 identifies third-party routing applications from a set of application sources 1370. As noted above, application sources may be defined to include any number of third-party application providers and/or hosts (e.g., online application stores, application distribution platforms, digital distribution services, etc.). The remote routing application identifier 1340 of some embodiments sends route data to the set of application sources 1370 and requests for relevant third-party routing applications based on the route data (e.g., third-party routing applications that are defined for the area along and/or around a route specified by the route data).

The application ranking module 1350 is responsible for ranking third-party routing applications. In some embodiments, the application ranking module 1350 ranks third-party routing application based on a set of factors. As mentioned above, examples of factors include the popularity of the application (e.g., the number of downloads, ratings, rating score, etc.), the frequency in which local and/or remote users send route directions to the application, the size of the geographic area specified by the application's coverage file (e.g., large areas ranked lower), the distance of the current location of the user with respect to the geographic area specified by the application's coverage file, the user rating of the application, etc. In order to facilitate maintaining the frequency in which users send route directions to the application, the mapping application of some embodiments automatically sends data to a centralized location (e.g., a dedicated set of computing devices, one of the defined applications sources, etc.) for storage and processing.

In some instances, the application ranking module 1350 receives different sets of ranked routing applications. For instance, the application ranking module 1350 might receive ranked routing applications from the local routing application identifier 1330 and ranked routing applications from the remote routing application identifier 1330. In some such instances, the application ranking module 1350 reconciles the different sets of ranked routing applications and generates a single set of ranked routing applications using the factors noted above.

An example operation of the mapping application 1300 will now be described. The operation begins by the routing data manager 1310 receiving route data 1305. As shown, the route data 1305 includes start location data, end location data, and in some instances, other data. Examples of other data include names associated with the start and end locations, phone numbers associate with the start and end locations, address book identifiers associated with the start and end locations that identify entries in an address book application installed on the device, etc. When the routing data manager 1310 receives the route data 1305, the routing data manager 1310 performs various operations on the route data 1305, such as translating, converting, modifying, and/or redacting data from the route data and passes the processed route data 1305 to the routing application manager 1320.

When the routing application manager 1320 receives the processed route data 1305, the routing application manager 1320 passes the processed route data 1305 to the local routing application identifier 1330 and the remote routing application identifier 1340 to identify third-party routing applications. When the local routing application identifier 1330 receives the processed route data 1305, the local routing application identifier 1330 accessing the installed applications storage 1360 to identify third-party routing applications that are installed on the device and defined for the area along and/or around a route specified by the route data. The local routing application identifier 1330 passes the identified routing applications to the routing application manager 1320.

When the remote routing application identifier 1340 receives the processed route data 1305 from the routing application manager 1320, the remote routing application identifier 1340 sends the route data 1305 to the set of application sources 1370 and requests for relevant third-party routing applications based on the route data (e.g., third-party routing applications that are defined for the area along and/or around a route specified by the route data). The remote routing application identifier 1340 then returns the identified routing applications to the routing application manager 1320.

When the routing application manager 1320 receives routing applications from the local routing application identifier 1330 and the remote routing application identifier 1340, the routing application manager 1320 sends the identified routing applications to the application ranking module 1350.

Next, the application ranking module 1350 ranks identified routing applications using the factors described above and returns a ranked list of the identified routing applications to the routing application manager 1320. When the routing application manager 1320 receives the ranked routing applications from the application ranking module 1350, the mapping application 1300 provides them to the user (e.g., by displaying the routing applications according to the applications' rankings).

Figure 14:
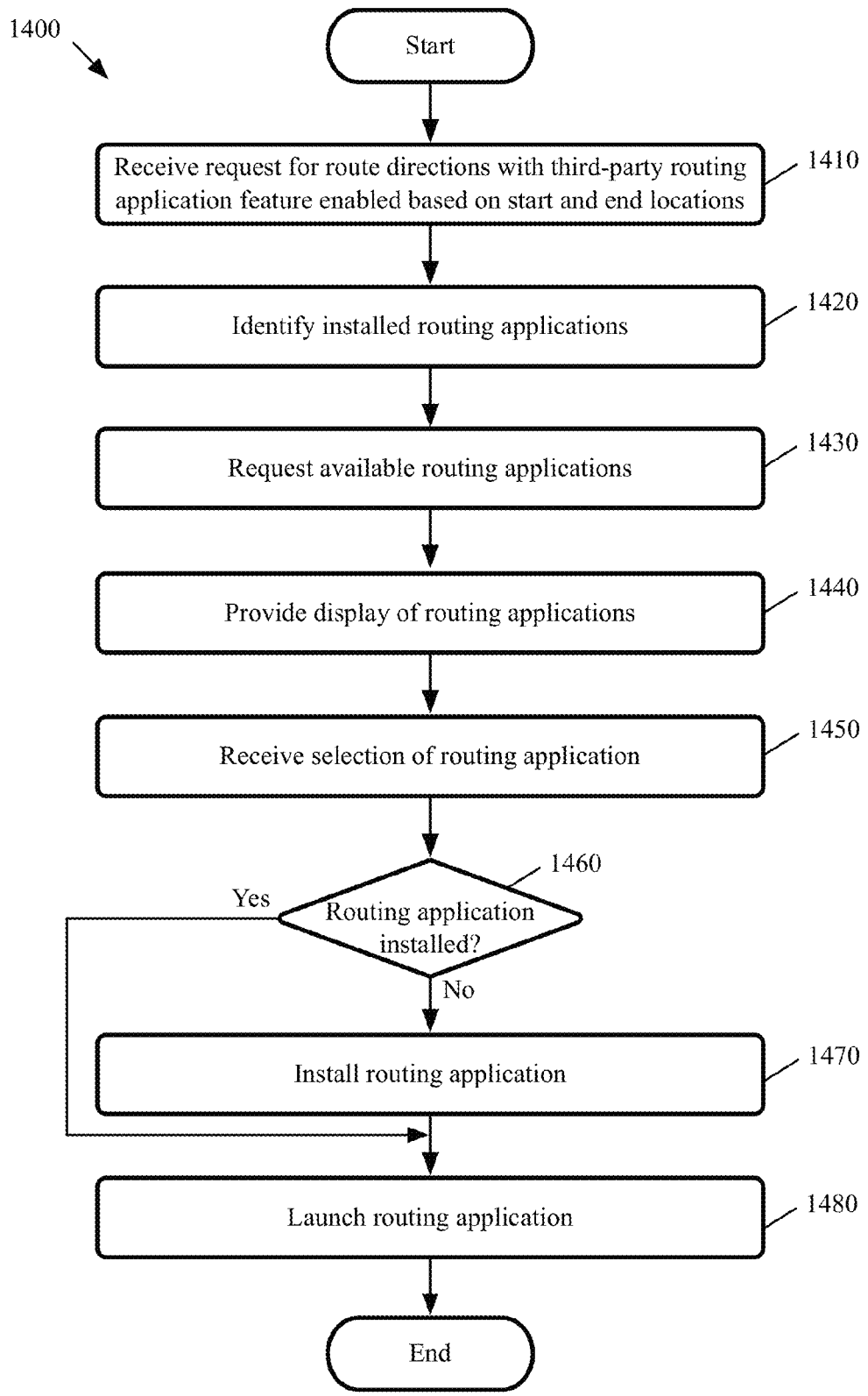
FIG. 14 conceptually illustrates a process of some embodiments for implementing a third-party routing application feature.

FIG. 14 conceptually illustrates a process 1400 of some embodiments for implementing a third-party routing application feature. In some embodiments, a mapping application that provides a third-party routing application feature performs the process 1400 (e.g., the mapping application described above by reference to FIG. 13).

The process 1400 starts by receiving (at 1410) a request for route directions with a third-party routing application feature enabled, based on start and end locations. In some embodiments, the process 1400 receives the request through a selection of a UI item (e.g., the UI item 835). Additional and/or other methods of receiving the request are possible. For instance, the process 1400 of some embodiments receives the request through a hotkey, a keystroke, a series of keystrokes, a combination of keystrokes, an option selected from a pop-up menu or pull-down menu, or any other appropriate method to request for route directions with a third-party routing application feature enabled.

As mentioned above, the mapping application of some embodiments manages its own dynamically-updated declaration of geographic coverage to maintain geographically relevant routing applications on-the-fly. In some such embodiments, the process 1400 receives requests for route directions with a third-party routing application feature enabled, based on the mapping application's declaration of geographic coverage.

Next, the process 1400 identifies (at 1420) third-party routing applications that are installed on the device. In some embodiments, the process 1400 identifies these routing applications by identifying installed third-party routing applications with coverage files that specify geographical areas within which the start and end locations specified in the directions editing interface are included. In other embodiments, the process 1400 also identifies installed routing applications with coverage files that specify geographical areas within which one of the locations is included. The process 1400 of some such embodiments only identifies installed routing applications with coverage files that specify geographical areas (1) within which one of the locations is included and (2) from which the other location is within a defined distance. In some cases, the device does not have any relevant third-party routing applications installed on the device, and thus, the process 1400 does not identify any installed application.

The process 1400 then requests (at 1430) for available third-party routing applications from a defined set of application sources. As mentioned above, the set of application sources may be defined to include any number of third-party application providers and/or hosts (e.g., online application stores, application distribution platforms, digital distribution services, etc.). In some embodiments, the process 1400 displays the identified applications (e.g., in a third-party routing application interface).

After requesting for available routing applications from application sources, the process 1400 provides (at 1440) a display of routing applications for selection. In some embodiments, the process 1400 generates a display that includes installed routing applications, available routing applications returned from the request for available third-party routing applications, or a combination of both types of routing applications.

As discussed above, the mapping application ranks third-party routing applications and displays the applications in the ranked order, in some embodiments. The process 1400 of some embodiments ranks the routing applications included in the display according to any of the techniques described above by reference to FIGS. 8 and 13 and arranges the display of the routing applications based on rankings of the applications.

The process 1400 then receives (at 1450) a selection of an identified third-party routing application to use to provide route directions. The process 1400 of some embodiments receives the selection through a selection of a UI item (e.g., the UI item 850 or the UI item 940). Additional and/or other methods of receiving the selection are possible. For example, in some embodiments, the process 1400 receives the selection through a hotkey, a keystroke, a series of keystrokes, a combination of keystrokes, an option selected from a pop-up menu or pull-down menu, or any other appropriate method to select a third-party routing application.

Next, the process 1400 determines (at 1460) whether the selected third-party routing application is installed on the device. When the process 1400 determines that the selected third-party routing application is installed on the device, the process 1400 proceeds to 1480. Otherwise, the process 1400 installs (at 1470) the selected routing application. In some embodiments, the process 1400 requires input from user (e.g., a selection of the UI item 935) in order to install the application. In other embodiments, the process 1400 automatically installs the selected application without input from the user.

Finally, the process 1400 launches (at 1480) the selected third-party routing application based on the start and end locations. The process 1400 of some embodiments sends route data (e.g., the start and end locations) to the third-party routing application when launching the application. In cases where the selected routing application had not yet been installed, the process 1400 of some embodiments requires input from user (e.g., a selection of the UI item 940) in order to launch the application. In other embodiments, the process 1400 automatically launches the selected application without input from the user after the process 1400 installs the application.

A. Indexing Applications

As described above, the mapping application of some embodiments sends request to application sources for third-party routing applications that are near the area of a route direction. In order to quickly search among the third-party routing applications and provide them to the mapping application, the application source of some embodiments indexes the third-party routing applications for fast and efficient retrieval.

As noted above, in some embodiments, a third-party routing application is associated with a coverage file that specifies a geographic area in which the application is relevant. In some embodiments, the application source indexes routing applications based on the applications' coverage files. For example, in some embodiments, the application source defines a hierarchy of Cartesian tiers that correspond to a map. Each Cartesian tier includes a grid with a different number of dimensions (e.g., 2×2, 3×3, 4×4, 5×5, etc.) that divides the map into a set of boxes (also referred to as grid boxes) defined by the grid. For instance, the Cartesian tier at the top of the hierarchy (e.g., tier 1) may be defined by a 1×1 grid that is the size of the entire map, the Cartesian tier at the bottom of the hierarchy (e.g., tier 15) may be defined by a grid with a largest number of dimensions, and the Cartesian tiers from the top of the hierarchy to the bottom of the hierarchy have grids with increasing numbers of dimensions. One of ordinary skill in the art will understand that the application source may define the hierarchy with any number of different Cartesian tiers with grids that have different levels of granularity (e.g., dimensions).

Figure 15:
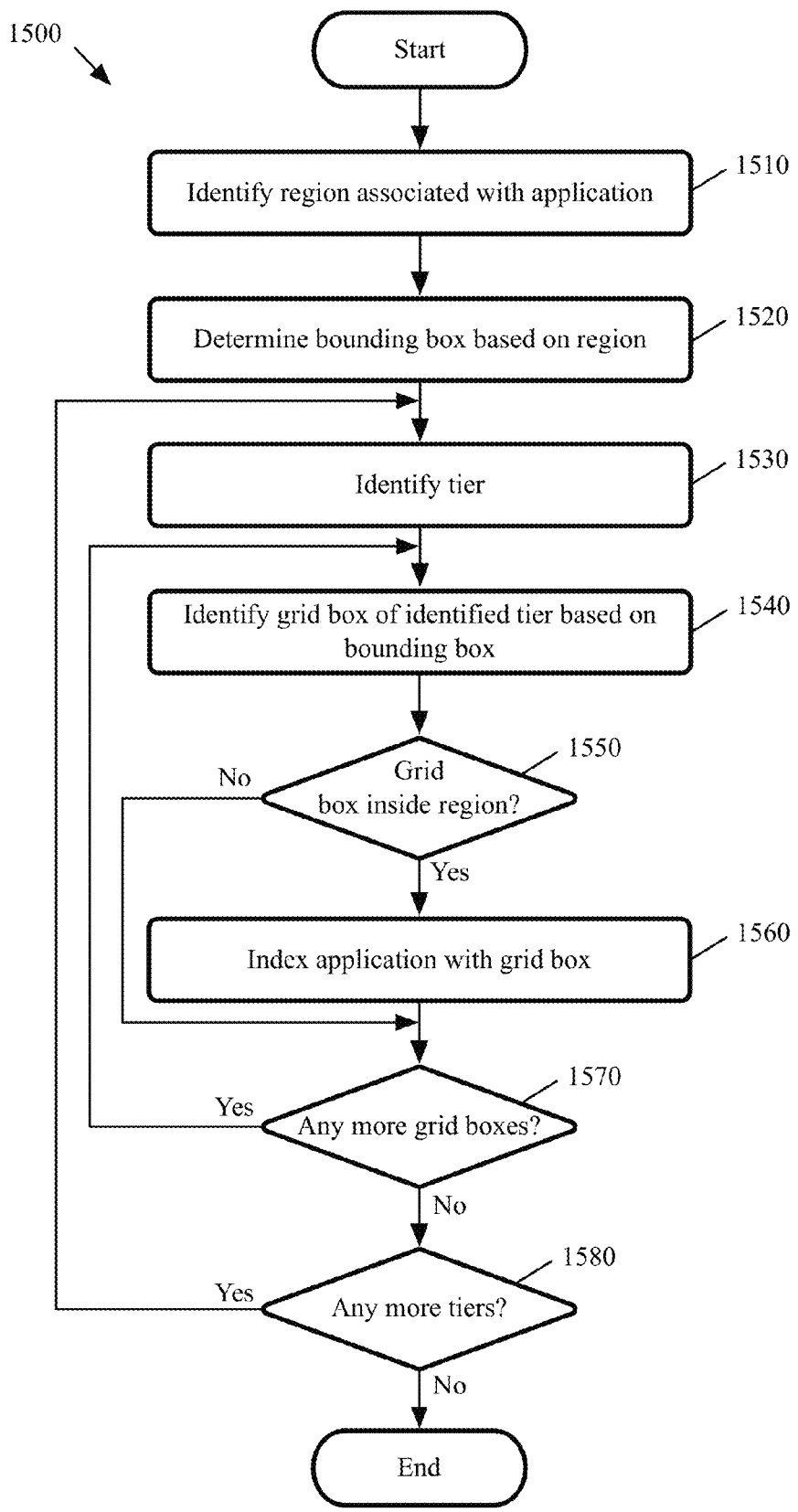
FIG. 15 conceptually illustrates a process of some embodiments for indexing a third-party routing application.

FIG. 15 conceptually illustrates a process 1500 of some embodiments for indexing a third-party routing application. The application source of some embodiments performs the process 1500 for each routing application provided by the application source. In some embodiments, the application source performs the process 1500 when application is added to the application source and not yet indexed. The application source of some embodiments utilizes batch processing and, thus, repeatedly performs the process 1500 to index any added by not yet indexed routing applications at defined intervals (e.g., 1 hour, 12 hours, 1 day, etc.).

Figure 16:
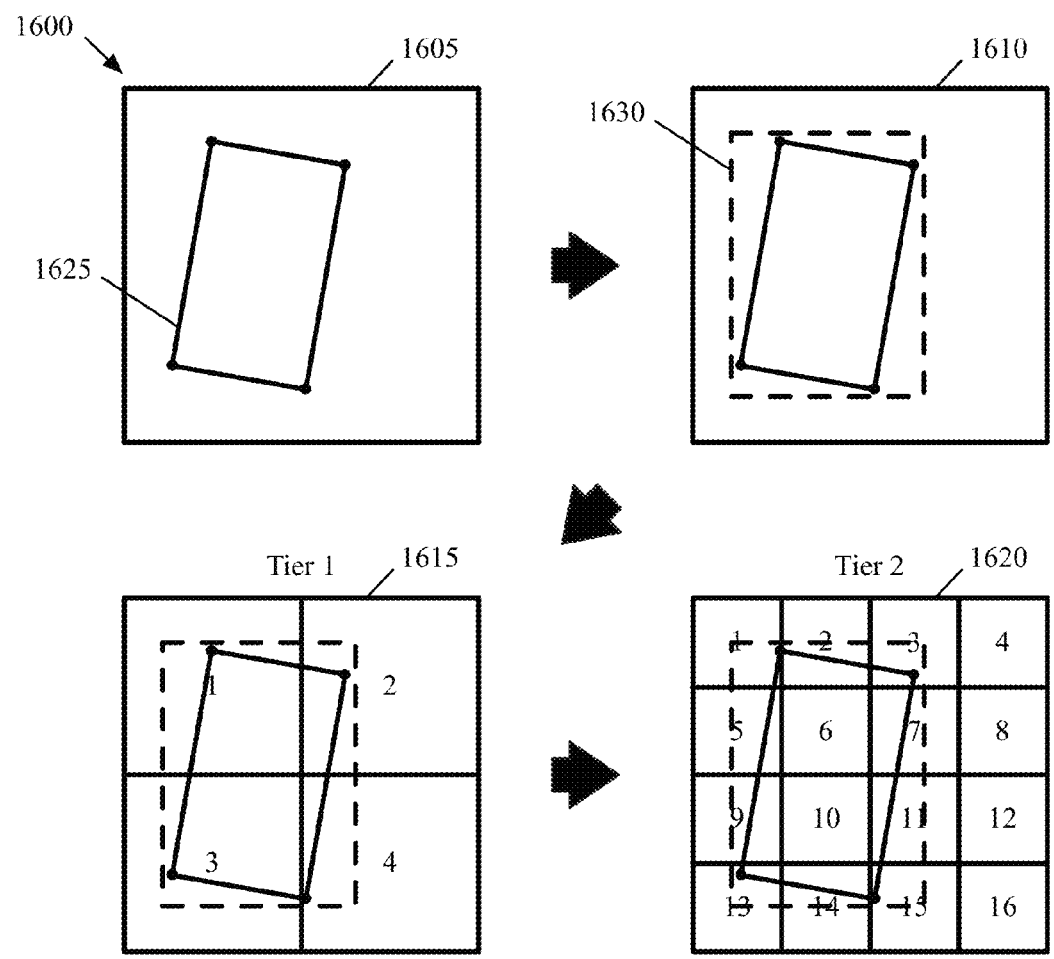
FIG. 16 conceptually illustrates an example of indexing an application according to some embodiments of the invention.

The process 1500 will be described by reference to FIG. 16, which conceptually illustrates an example of indexing an application according to some embodiments of the invention. In particular, FIG. 16 illustrates four stages 1605-1620 that show indexing an application based on a region 1625 of a map 1600 in which the application is defined as relevant.

The process 1500 starts by identifying (at 1510) a region in a map associated with the application. As mentioned above, in some embodiments, a third-party routing application is associated with a coverage file that specifies a geographic area in which the application is relevant. The coverage file of some embodiments specifies the geographic area as a polygon defined by an ordered set of vertices. In some embodiments, the coverage file is a formatted according to a GeoJSON format. Referring to FIG. 16 as an example, the first stage 1620 illustrates the map 1600 and the region 1625 in which the application is defined as relevant for this example. As shown, the region 1625 is a rectangular polygon that is defined by four vertices.

Next, the process 1500 determines (at 1520) a bounding box in the map based on the region. The process 1500 of different embodiments use different techniques to determine the bounding box in the map. For instance, the process 1500 of some embodiments uses the maximum and minimum Cartesian coordinate values of the vertices that define the region to form the sides of the bounding box by (1) iterating through all the points of the region, (2) maintaining a minimum X, minimum Y, maximum X, and maximum Y coordinate values, and generating a bounding box having a point with the minimum X and Y values and another point in the opposite diagonal corner with the maximum X and Y values. Referring to FIG. 16 as an example, the second stage 1610 illustrates a bounding box 1630 in the map 1600 that is determined based on the maximum and minimum Cartesian coordinate values of the vertices of the region 1625.

The process 1500 then identifies (at 1530) a tier in a hierarchy of Cartesian tiers. In some embodiments, the process 1500 identifies the top tier of the hierarchy and then iterates down the hierarchy when subsequent tiers are processed. Next, the process 1500 identifies (at 1540) a grid box in the identified tier based on the bounding box. As noted above, each Cartesian tier in some embodiments includes a grid with a different number of dimensions that divides a map into a set of grid boxes defined by the grid. In some embodiments, the process 1500 identifies a grid box in the tier with which that the bounding box overlaps.

After identifying a grid box, the process 1500 determines (at 1550) whether the grid box is inside the region in the map associated with the application. When the process 1500 determines that the grid box is inside the region in the map, the process 1500 continues to 1560. Otherwise, the process 1500 proceeds to 1570. In some embodiments, when the process 1500 determines that the grid box overlaps or intersects the region in the map, the process 1500 continues to 1560 (to index the grid box).

FIG. 16 shows examples of identifying a grid box and determining whether to index the application using the grid box in two different tiers. As shown, the third stage 1615 illustrates a tier (Tier 1 in this example) of the hierarchy of Cartesian tiers that has four grid boxes. In the third stage 1615, the process 1500 iteratively identifies grid boxes 1-4 since the bounding box 1630 overlaps with each of the grid boxes 1-4. The process 1500 does not index the application with any of the grid boxes 1-4 because none of the grid boxes are within the region 1625. For embodiments where the process 1500 indexes grid boxes that intersect the region in the map, the process 1500 indexes the grid boxes 1-4 for Tier 1 of the hierarchy.

The fourth stage 1620 illustrates another tier (Tier 2 in this example) of the hierarchy of Cartesian tiers that has sixteen grid boxes. Here, the process 1500 iteratively identifies grid boxes 1-3, 5-7, 9-11, and 13-15 as the bounding box 1630 overlaps with each of these grid boxes. The process 1500 only indexes the application with grid boxes 6 and 10 since those are the only identified grid boxes that are within the region 1625. For embodiments where the process 1500 indexes grid boxes that intersect the region in the map, the process 1500 indexes the grid boxes 1-3, 5-7, 9-11, and 13-15 for Tier 2 of the hierarchy.

Returning to FIG. 15, at 1560, the process 1500 indexes the application with the identified grid box. In some embodiments, the process 1500 indexes the application with the grid box by adding the application to a list of applications associated with the grid box. The process 1500 of some embodiments indexes the application by encoding the coordinates of the grid box (e.g., the row and column location of the grid within the tier). For instance, in some embodiments the process 1500 encodes the coordinates by (1) converting the coordinates of the grid box to a floating point number (e.g., grid square {12, 15} is encoded as 12.15), (2) converting the floating point number to a 64-bit binary representation (e.g., according to a Institute of Electrical and Electronics Engineers (IEEE) 754 specification), and (3) converting the 64-bit binary representation into a string. Some embodiments convert the 64-bit binary representation into a string by (1) splitting the bits into groups of 7 and (2) converting each 7-bit number into an American Standard Code for Information Interchange (ASCII) character to produce a 10-character string. After encoding the coordinates of the grid box, the process 1500 in some embodiments stores in an inverted index for the identified tier the encoded coordinates with an identifier that identifies the application.

Next, the process 1500 determines (at 1570) whether any grid box of the tier is left to process. When the process 1500 determines that there is a grid box of the tier is left to process, the process 1500 returns to 1540 to continue processing any remaining grid boxes. Otherwise, the process 1500 determines (at 1580) whether any tier in the hierarchy of Cartesian tiers is left to process. When the process 1500 determines that there is a tier left to process, the process 1500 returns to 1530 to continue processing any remaining tiers in the hierarchy of Cartesian tiers. When the process 1500 determines that there is not a tier left to process, the process 1500 ends.

B. Searching for Applications

Figure 17:
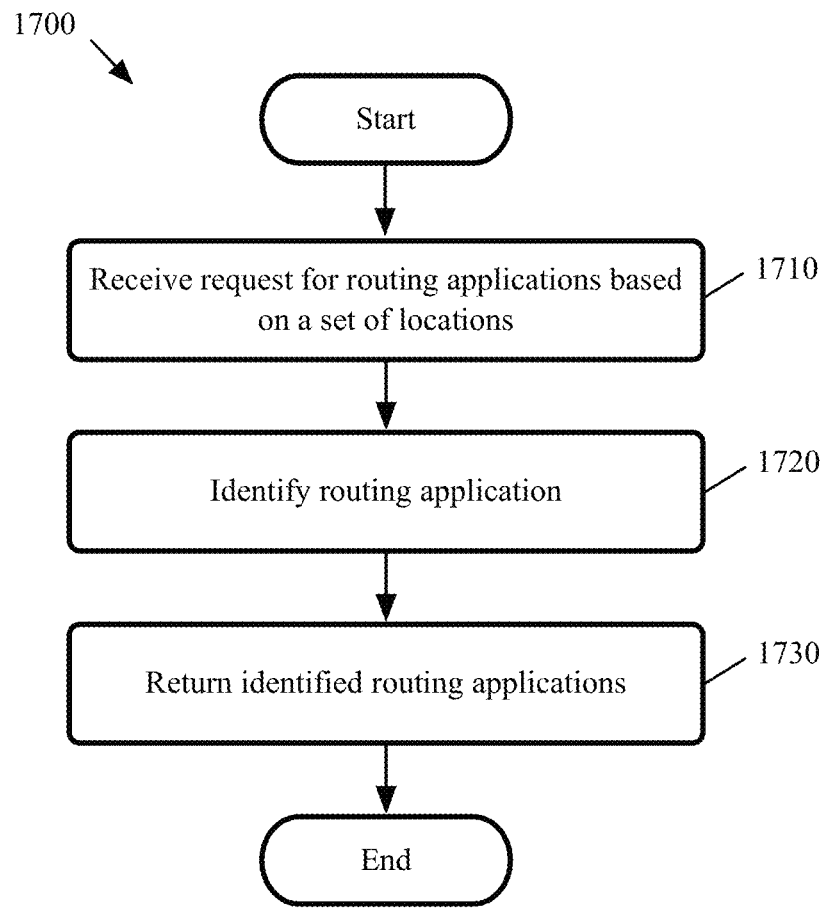
FIG. 17 conceptually illustrates a process of some embodiments for identifying third-party routing applications available on an application source.

FIG. 17 conceptually illustrates a process 1700 of some embodiments for identifying third-party routing applications available on an application source. In some embodiments, the application source performs the process 1700 to identify third-party routing applications provided by and/or hosted on the application source. The application source of some such embodiments performs the process 1700 in response to a request from a mapping application for third-party routing applications.

The process 1700 begins by receiving (at 1710) a request for third-party routing applications base on a set of locations. In some embodiments, the set of locations include a start location and an end location for route directions. The set of locations of some embodiments includes additional and/or other locations (e.g., intermediary destination locations) for route directions.

Next, the process 1700 identifies (at 1720) routing applications based on the set of locations. The process 1700 of different embodiments use different techniques to identify routing applications. For instance, the application source of some embodiments identifies routing applications based on a cartographic index of routing applications. In some embodiments, the application source indexes routing applications using a hierarchy of cartographic tiles (e.g., a 15 level hierarchy).

The first level of the hierarchy includes a set of course cartographic tiles that together covers a defined region (e.g., a state, a country, a continent, etc.). Each cartographic tile in the first level of the hierarchy is associated with a set of cartographic tiles in the second level that together represents the first level cartographic tile. The set of cartographic tiles in the second level associated with the first level tile provides a more granular decomposition of the first level cartographic tile. The cartographic tile in each level is associated with a set of cartographic tiles in the next level in the similar manner explained.

As noted above, the third-party routing application of some embodiments is associated with a coverage file that specifies a geographic area in which the application is relevant. When the application source receives such a third-party routing application, the application source indexes the application by (1) identifying the top-most tile in the hierarchy that includes the geographic area specified by the routing application's coverage file and (2) indexing the application as associated with the identified tile and all of its associated lower-level sets of tiles. In this fashion, the application source is able to quickly identify any and all routing applications that are specified as geographically related to a particular geographic area (i.e., the geographic areas specified by the coverage files of the identified routing applications are all associated with in a particular cartographic tile that represents the particular geographic area).

For embodiments that utilize a cartographic index, the process 1700 identifies the third-party routing applications based on the set of locations by (1) identifying the top-most tile in the hierarchy that includes the set of locations and (2) identifying all the routing applications that are associated with the tile. In some embodiments, the process 1700 may identify the cartographic tile one level higher to which the top-most file is associated (e.g., using the top-most tile is not associated with any routing applications) and then identify the routing applications that are associated with the higher-level tile. Other methods are possible.

Finally, the process 1700 returns (at 1730) the identified third-party routing applications to the requestor. In some embodiments, the process 1700 also returns for each identified third-party routing application a product page associated with the routing application (e.g., similar to the product page described above by reference to FIG. 9).

Figure 18:
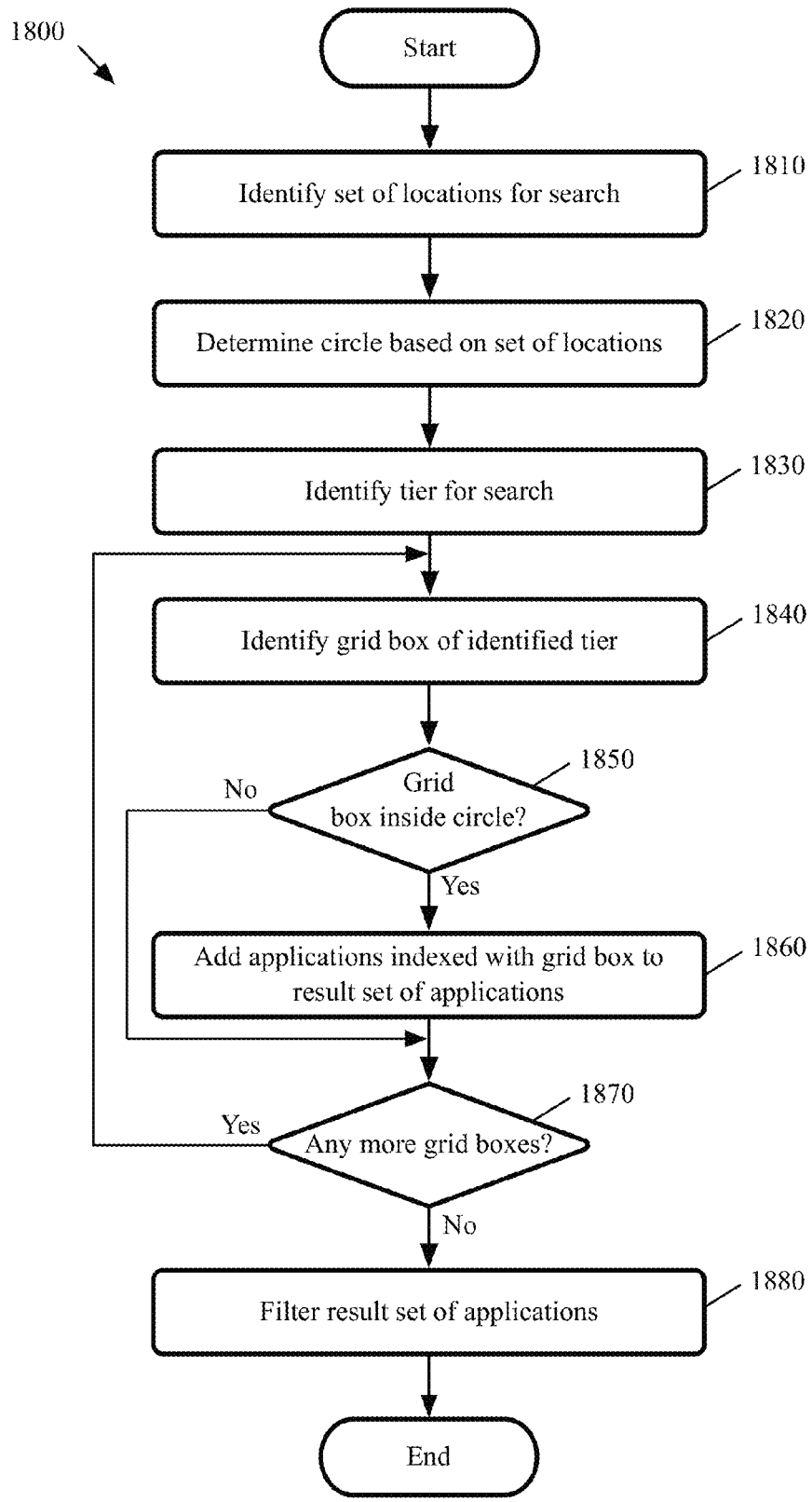
FIG. 18 conceptually illustrates a process of some embodiments for searching for third-party routing applications.

As explained above, the application source of some embodiments indexes third-party routing applications for fast and efficient retrieval using a hierarchy of Cartesian tiers. FIG. 18 conceptually illustrates a process 1800 of some embodiments for searching for third-party routing applications based on such an index. In some embodiments, the process 1700, which is described above by reference to FIG. 17, performs the process 1800 as part of operation 1720 to identify routing applications.

The process 1800 begins by identifying (at 1810) a set of locations for performing the search. The set of locations specified in the request for routing applications. As noted above, the set of locations includes a start location and an end location of a route, in some embodiments.

Next, the process 1800 determines (at 1820) a circle based on the set of locations. The process 1800 of different embodiments use different methods to determine the circle. In some embodiments, the process 1800 uses one of the locations as the center of the circle and defines a radius for the circle such that the circle encompasses the set of locations. The process 1800 of some embodiments defines a line between the set of locations and uses the midpoint of the line as the center of the circle and similarly and defines a radius for the circle so that the circle encompasses the set of locations. The process 1800 may be use additional and/or different methods in some embodiments.

The process 1800 then identifies (at 1830) a tier in the hierarchy of Cartesian tiers in which to perform the search. In some embodiments, the process 1800 identifies the tier based on the radius of the circle. The process 1800 in some embodiments identifies the tier in the hierarchy where the size of the individual grid boxes is most similar to the diameter of the circle.

In some embodiments, the process 1800 identifies the tier in the hierarchy that has the most number of grid boxes intersecting the circle and the number of intersecting grid boxes is less than a defined threshold amount. For instance, the process 1800 of some embodiments identifies the tier in the hierarchy with the most number of grid boxes intersecting the circle that is less than a five. As such, when a tier has four (but no more) grid boxes that intersect the circle the process 1800 identifies the tier. In some embodiments, when no such tier exists, the process 1800 identifies the highest tier in the hierarchy.

After identifying the tier, the process 1800 then identifies (at 1840) a grid box in the identified tier. Next, the process 1800 determines (at 1850) whether the grid box is inside the circle. When the process 1800 determines that the grid box is inside the circle, the process 1800 continues to 1860. Otherwise, the process 1800 proceeds to 1870.

At 1860, the process 1800 adds the applications indexed with the grid box to the result set of applications. The process 1800 then determines (at 1870) whether any grid box of the tier is left to process. When the process 1800 determines that there is a grid box of the tier is left to process, the process 1800 returns to 1840 to continue processing any remaining grid boxes. Otherwise, the process 1800 continues to 1870.

Finally, the process 1800 filters (at 1880) the result set of applications to refine the search results and eliminate applications that are not relevant. Different embodiments use different approaches to filter the result set of applications. One approach is described in detail below by reference to FIG. 19.

Figure 19:
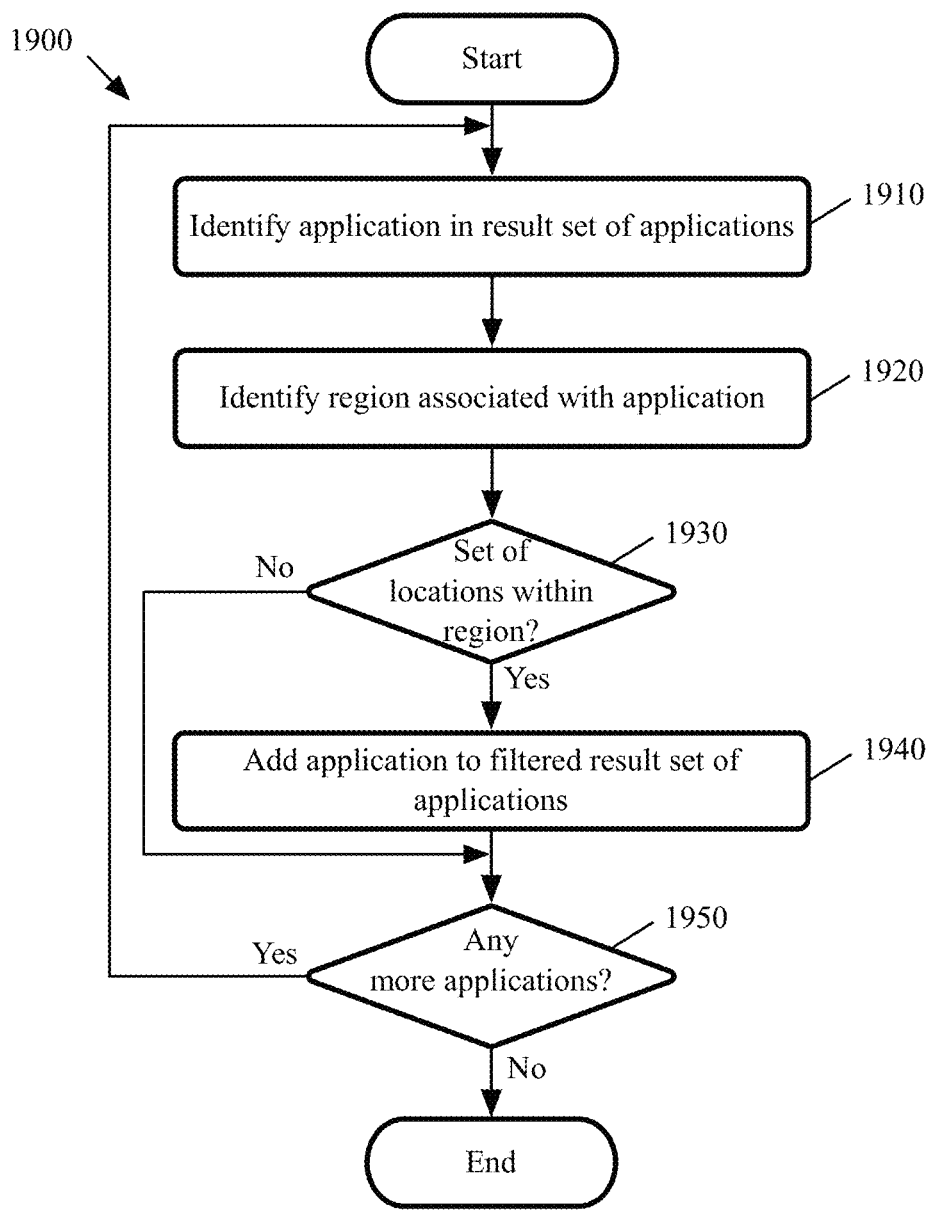
FIG. 19 conceptually illustrates a process of some embodiments for filtering search results of third-party routing applications.

FIG. 19 conceptually illustrates a process 1900 of some embodiments for filtering search results of third-party routing applications. In some embodiments, the process 1800 that is described above by reference to FIG. 18 performs the process 1900 as part of operation 1880 to filter the result set of applications.

The process 1900 starts by identifying (at 1910) an application in the result set of applications. Next, the process 1900 identifies (at 1920) the region associated with the identified application. As mentioned above, the third-party routing application of some embodiments is associated with a coverage file that specifies a geographic area in which the application is relevant. In such embodiments, the process 1900 identifies the geographic area specified in the application's coverage file.

The process 1900 then determines (at 1930) whether the set of locations (e.g., a start location and an end location) used to produce the resulting set of applications is within the identified region associated with the application. When the process 1900 determines that the set of locations is within the region, the process 1900 adds (at 1940) the application to a filtered result set of applications. Otherwise, the process 1900 proceeds to 1950.

At 1950, the process 1900 determines whether any application in the result set of applications is left to process. When the process 1900 determines that there is an application left to process, the process 1900 returns to 1910 to continue processing any remaining applications in the result set of applications. Otherwise, the process 1900 ends.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 20:
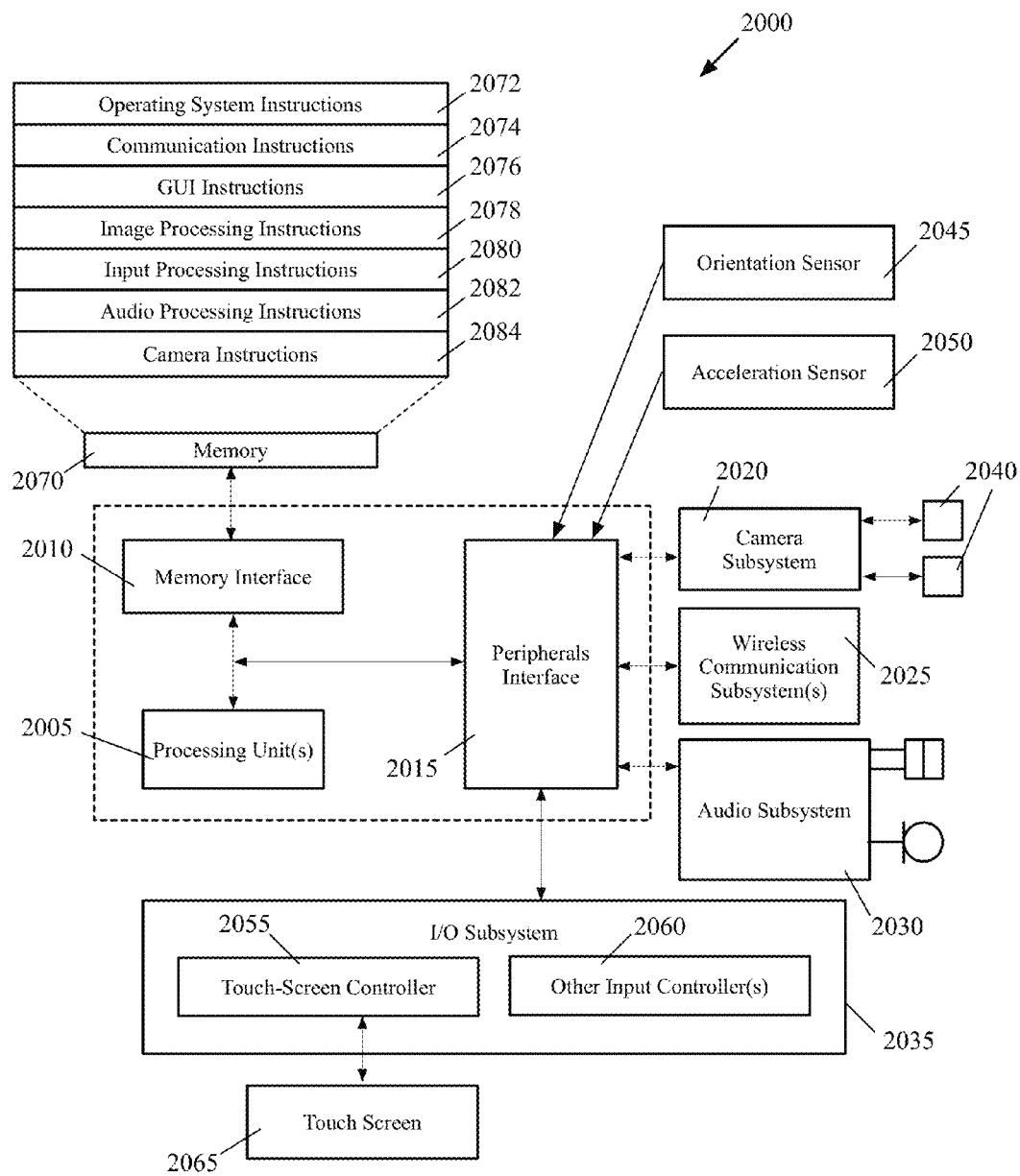
FIG. 20 conceptually illustrates is an architecture of a mobile computing device with which some embodiments are implemented.

The mapping and navigation applications of some embodiments operate on mobile devices, such as smart phones (e.g., iPhones®) and tablets (e.g., iPads®). FIG. 20 is an example of an architecture 2000 of such a mobile computing device. Examples of mobile computing devices include smartphones, tablets, laptops, etc. As shown, the mobile computing device 2000 includes one or more processing units 2005, a memory interface 2010 and a peripherals interface 2015.

The peripherals interface 2015 is coupled to various sensors and subsystems, including a camera subsystem 2020, a wireless communication subsystem(s) 2025, an audio subsystem 2030, an I/O subsystem 2035, etc. The peripherals interface 2015 enables communication between the processing units 2005 and various peripherals. For example, an orientation sensor 2045 (e.g., a gyroscope) and an acceleration sensor 2050 (e.g., an accelerometer) are coupled to the peripherals interface 2015 to facilitate orientation and acceleration functions.

The camera subsystem 2020 is coupled to one or more optical sensors 2040 (e.g., a charged coupled device (CCD)

optical sensor, a complementary metal-oxide-semiconductor (CMOS) optical sensor, etc.). The camera subsystem 2020 coupled with the optical sensors 2040 facilitates camera functions, such as image and/or video data capturing. The wireless communication subsystem 2025 serves to facilitate communication functions. In some embodiments, the wireless communication subsystem 2025 includes radio frequency receivers and transmitters, and optical receivers and transmitters (not shown in FIG. 20). These receivers and transmitters of some embodiments are implemented to operate over one or more communication networks such as a GSM network, a Wi-Fi network, a Bluetooth network, etc. The audio subsystem 2030 is coupled to a speaker to output audio (e.g., to output voice navigation instructions). Additionally, the audio subsystem 2030 is coupled to a microphone to facilitate voice-enabled functions, such as voice recognition (e.g., for searching), digital recording, etc.

The I/O subsystem 2035 involves the transfer between input/output peripheral devices, such as a display, a touch screen, etc., and the data bus of the processing units 2005 through the peripherals interface 2015. The I/O subsystem 2035 includes a touch-screen controller 2055 and other input controllers 2060 to facilitate the transfer between input/output peripheral devices and the data bus of the processing units 2005. As shown, the touch-screen controller 2055 is coupled to a touch screen 2065. The touch-screen controller 2055 detects contact and movement on the touch screen 2065 using any of multiple touch sensitivity technologies. The other input controllers 2060 are coupled to other input/control devices, such as one or more buttons. Some embodiments include a near-touch sensitive screen and a corresponding controller that can detect near-touch interactions instead of or in addition to touch interactions.

The memory interface 2010 is coupled to memory 2070. In some embodiments, the memory 2070 includes volatile memory (e.g., high-speed random access memory), non-volatile memory (e.g., flash memory), a combination of volatile and non-volatile memory, and/or any other type of memory. As illustrated in FIG. 20, the memory 2070 stores an operating system (OS) 2072. The OS 2072 includes instructions for handling basic system services and for performing hardware dependent tasks.

The memory 2070 also includes communication instructions 2074 to facilitate communicating with one or more additional devices; graphical user interface instructions 2076 to facilitate graphic user interface processing; image processing instructions 2078 to facilitate image-related processing and functions; input processing instructions 2080 to facilitate input-related (e.g., touch input) processes and functions; audio processing instructions 2082 to facilitate audio-related processes and functions; and camera instructions 2084 to facilitate camera-related processes and functions. The instructions described above are merely exemplary and the memory 2070 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 20 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 20 may be split into two or more integrated circuits.

B. Computer System

Figure 21:
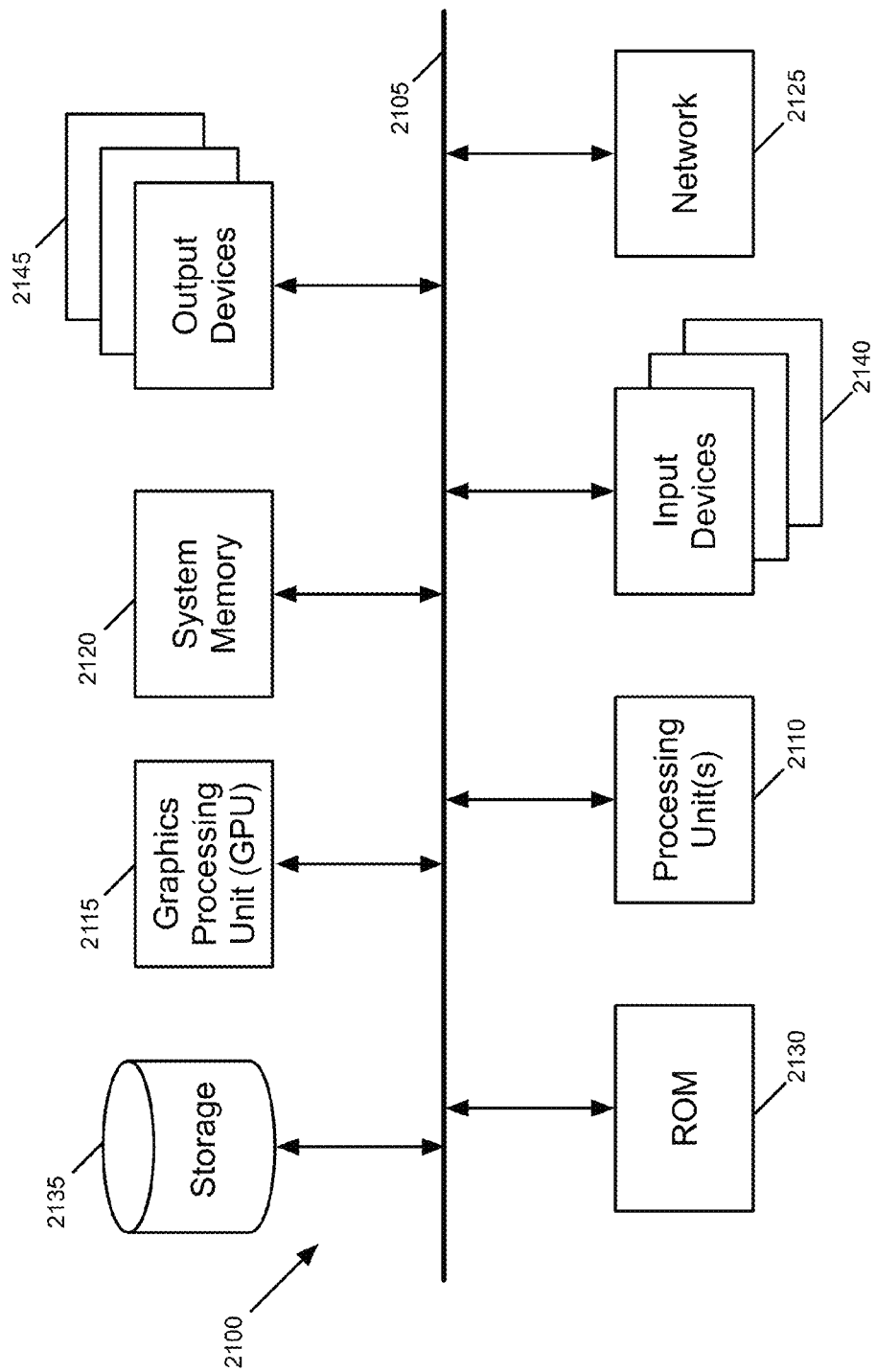
FIG. 21 conceptually illustrates an electronic device with which some embodiments of the invention are implemented.

FIG. 21 conceptually illustrates another example of an electronic system 2100 with which some embodiments of the invention are implemented. The electronic system 2100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2100 includes a bus 2105, processing unit(s) 2110, a graphics processing unit (GPU) 2115, a system memory 2120, a network 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the GPU 2115, the system memory 2120, and the permanent storage device 2135.

From these various memory units, the processing unit(s) 2110 retrieves instructions to execute and data to process in order to execute the processes of the invention. The processing unit(s) may be a single processor or a multi-core processor in different embodiments. Some instructions are passed to and executed by the GPU 2115. The GPU 2115 can offload various computations or complement the image processing provided by the processing unit(s) 2110. In some embodiments, such functionality can be provided using CoreImage's kernel shading language.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive, integrated flash memory) as the permanent storage device 2135.

Other embodiments use a removable storage device (such as a floppy disk, flash memory device, etc., and its corresponding drive) as the permanent storage device. Like the permanent storage device 2135, the system memory 2120 is a read-and-write memory device. However, unlike storage device 2135, the system memory 2120 is a volatile read-and-write memory, such a random access memory. The system memory 2120 stores some of the instructions and data that the processor needs at runtime. In some embodiments, the invention's processes are stored in the system memory 2120, the permanent storage device 2135, and/or the read-only memory 2130. From these various memory units, the processing unit(s) 2110 retrieves instructions to execute and data to process in order to execute the processes of some embodiments.

The bus 2105 also connects to the input and output devices 2140 and 2145. The input devices 2140 enable the user to communicate information and select commands to the electronic system. The input devices 2140 include alphanumeric keyboards and pointing devices (also called "cursor control devices"), cameras (e.g., webcams), microphones or similar devices for receiving voice commands, etc. The output devices 2145 display images generated by the electronic system or otherwise output data. The output devices 2145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 21, bus 2105 also couples electronic system 2100 to a network 2125 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VI. Map Service Environment

Figure 22:
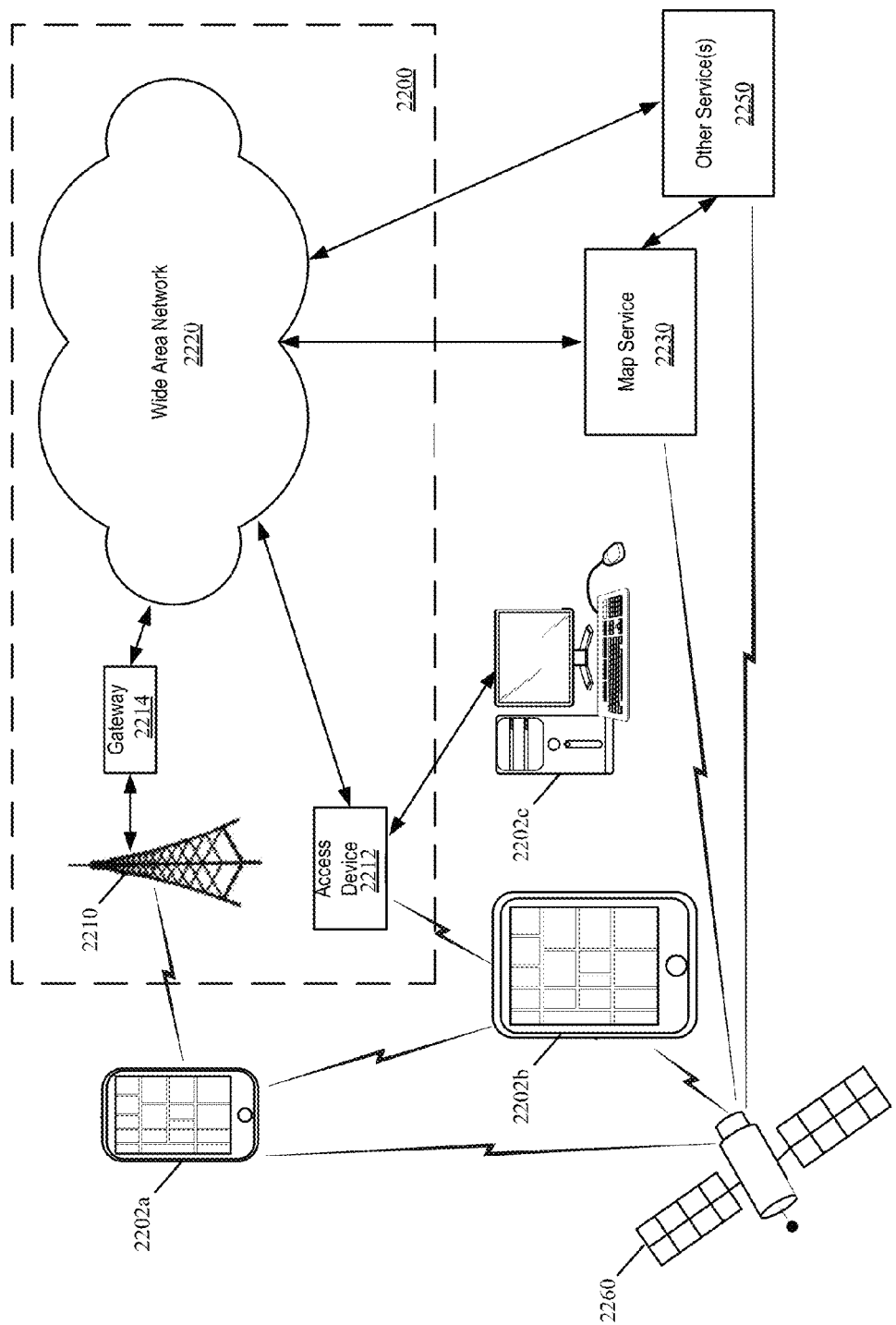
FIG. 22 conceptually illustrates a map service operating environment according to some embodiments.

Various embodiments may operate within a map service operating environment. FIG. 22 illustrates a map service operating environment, according to some embodiments. A map service 2230 (also referred to as mapping service) may provide map services for one or more client devices 2202a-2202c in communication with the map service 2230 through various communication methods and protocols. A map service 2230 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 2202a-2202c may utilize these map services by obtaining map service data. Client devices 2202a-2202c may implement various techniques to process map service data. Client devices 2202a-2202c may then provide map services to various entities, including, but not limited to, users, internal software or hardware modules, and/or other systems or devices external to the client devices 2202a-2202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 2202a-2202c) are implemented on different portable-multi-function device types. Client devices 2202a-2202c utilize map service 2230 through various communication methods and protocols. In some embodiments, client devices 2202a-2202c obtain map service data from map service 2230. Client devices 2202a-2202c request or receive map service data. Client devices 2202a-2202c then process map service data (e.g., render and/or display the data) and may send the data to another software or hardware module on the device or to an external device or system.

A client device, according to some embodiments, implements techniques to render and/or display maps. These maps may be requested of received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 22 illustrates one possible embodiment of an operating environment 2200 for a map service 2230 and client devices 2202a-2202c. In some embodiments, devices 2202a, 2202b, and 2202c communicate over one or more wire or wireless networks 2210. For example, wireless network 2210, such as a cellular network, can communicate with a wide area network (WAN) 2220, such as the Internet, by use of gateway 2214. A gateway 2214 in some embodiments provides a packet oriented mobile data service, such as General Packet Radio Service (GPRS), or other mobile data service allowing wireless networks to transmit data to other networks, such as wide area network 2220. Likewise, access device 2212 (e.g., IEEE 802.11g wireless access device) provides communication access to WAN 2220. Devices 2202a and 2202b can be any portable electronic or computing device capable of communicating with a map service. Device 2202c can be any non-portable electronic or computing device capable of communicating with a map service.

In some embodiments, both voice and data communications are established over wireless network 2210 and access device 2212. For instance, device 2202a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 2210, gateway 2214, and WAN 2220 (e.g., using Transmission Control Protocol/Internet Protocol (TCP/IP) or User Datagram Protocol (UDP)). Likewise, in some implementations, devices 2202b and 2202c can place and receive phone calls, send and receive e-mail messages, and retrieve electronic documents over access device 2212 and WAN 2220. In various embodiments, any of the illustrated client device may communicate with map service 2230 and/or other service(s) 2250 using a persistent connection established in accordance with one or more security protocols, such as the Secure Sockets Layer (SSL) protocol or the Transport Layer Security (TLS) protocol.

Devices 2202a and 2202b can also establish communications by other means. For example, wireless device 2202a can communicate with other wireless devices (e.g., other devices 2202b, cell phones, etc.) over the wireless network 2210. Likewise devices 2202a and 2202b can establish peer-to-peer communications 2240 (e.g., a personal area network) by use of one or more communication subsystems, such as Bluetooth® communication from Bluetooth Special Interest Group, Inc. of Kirkland, Wash. Device 2202c can also establish peer to peer communications with devices 2202a or 2202b (not shown). Other communication protocols and topologies can also be implemented. Devices 2202a and 2202b may also receive Global Positioning Satellite (GPS) signals from GPS satellites 2260.

Devices 2202a, 2202b, and 2202c can communicate with map service 2230 over the one or more wire and/or wireless networks, 2210 or 2212. For instance, map service 2230 can provide a map service data to rendering devices 2202a, 2202b, and 2202c. Map service 2230 may also communicate with other services 2250 to obtain data to implement map services. Map service 2230 and other services 2250 may also receive GPS signals from GPS satellites 2260.

In various embodiments, map service 2230 and/or other service(s) 2250 are configured to process search requests from any of client devices. Search requests may include but are not limited to queries for business, address, residential locations, points of interest, or some combination thereof. Map service 2230 and/or other service(s) 2250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2230 and/or other service(s) 2250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2230 and/or other service(s) 2250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2230 and/or other service(s) 2250 provide one or more feedback mechanisms to receive feedback from client devices 2202*a*-2202*c*. For instance, client devices may provide feedback on search results to map service 2230 and/or other service(s) 2250 (e.g., feedback specifying ratings, reviews, temporary or permanent business closures, errors etc.); this feedback may be used to update information about points of interest in order to provide more accurate or more up-to-date search results in the future. In some embodiments, map service 2230 and/or other service(s) 2250 may provide testing information to the client device (e.g., an A/B test) to determine which search results are best. For instance, at random intervals, the client device may receive and present two search results to a user and allow the user to indicate the best result. The client device may report the test results to map service 2230 and/or other service(s) 2250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, swipe gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 14, 15, and 17-19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a mapping application which when executed on a device by at least one processing unit provides routing information to third-party applications on the device, the mapping application comprising sets of instructions for:
   receiving route data comprising first and second locations;
   identifying, based on the received route data, a set of routing applications from said third party applications, wherein each routing application in the set of routing applications provides navigation information from the first location to the second location in a different manner;
   presenting for each routine application in the identified set of routing applications, a selectable icon that represents the routing application;
   receiving a selection of a selectable icon corresponding to a routing application in the set of routing applications; and
   passing, upon receiving the selection, the route data to the selected routing application in order for the routing application to provide navigation information from the first location to the second location.

2. The non-transitory machine readable medium of claim 1, wherein the mapping application further comprises a set of instructions for receiving a selection of a routing application option that enables the mapping application to provide the set of routing applications, wherein the set of instructions for providing the set of routing applications comprises a set of instructions for providing the set of routing applications when the routing application option is selected.

3. The non-transitory machine readable medium of claim 1, wherein the navigation information comprises a route direction from the first location to the second location.

4. The non-transitory machine readable medium of claim 1, wherein the route data further comprises names that are associated with the first and second locations.

5. The non-transitory machine readable medium of claim 1, wherein the set of instructions for identifying the set of routing applications that are installed on the device comprises a set of instructions for identifying at least one routing application that was previously installed on the device, wherein the routing application specifies a geographical area that includes at least one of the first and second locations.

6. The non-transitory machine readable medium of claim 5, wherein the other one of the first and second locations that is not included in the geographical area is within a defined distance from the geographical area.

7. The non-transitory machine readable medium of claim 5, wherein the geographical area includes both of the first and second locations.

8. The non-transitory machine readable medium of claim 1, wherein the set of instructions for identifying the set of routing applications comprises a set of instructions for sending the route data and a request to an application source that hosts a plurality of routing applications, wherein the application source provides routing applications that are relevant to the route data.

9. The non-transitory machine readable medium of claim 1, wherein the selected routing application is for providing navigation information via train.

10. The non-transitory machine readable medium of claim 1, wherein the selected routing application is for providing navigation information via bus.

11. The non-transitory machine readable medium of claim 1, wherein the selected routing application is for providing navigation information via trails.

12. The non-transitory machine readable medium of claim 1, wherein the selected routing application is for providing navigation information via taxi.

13. A method of providing a graphical user interface (GUI) for a mapping application running on a device, the method comprising:
- providing a set of editable user interface (UI) controls for receiving input specifying first and second locations; and
- providing a navigation tool for:
  - identifying a set of at least two routing applications that are installed on the device, each routing application providing navigation information from the first location to the second location in a different manner;
  - presenting a set of selectable UI items that represents the identified set of routing applications; and
  - receiving a selection of a selectable UI item in the set of selectable UI items, wherein the selection causes the mapping application to send the first and second locations' data to the routing application represented by the selected UI item in order for the routing application to provide navigation information from the first location to the second location.

14. The method of claim 13 further comprising providing a selectable UI item that when selected causes the navigation tool to display the set of selectable UI items.

15. The method of claim 13, wherein receiving the selection of the selectable UI item further causes the mapping application to execute the routing application on the device to display navigation information of the routing application between the first and second locations.

16. The method of claim 13, wherein the set of selectable UI items comprises a first set of selectable UI items that represents routing applications that are installed on the device, wherein the navigation tool displays the first set of selectable UI items in a display area.

17. The method of claim 16, wherein the display area is a first display area and the identified set of routing applications is a first set of routing applications, wherein the navigation tool is further for selecting a second set of routing applications that are available but not installed on the device, wherein the set of selectable UI items further comprises a second set of selectable UI items that represents routing applications that are available for installation on the device, wherein the navigation tool displays the second set of selectable UI items in a second display area different than the first display area.

18. The method of claim 17, wherein the navigation tool is further for receiving a selection of a UI item in the second set of selectable UI items, wherein receiving the selection of the UI item further causes the mapping application to install the routing application represented by the UI item before sending the first and second locations' data to the routing application.

19. The method of claim 18, wherein receiving the selection of the UI item further causes the mapping application to display an application detail page associated with the routing application represented by the UI item before installing the routing application.

20. The method of claim 13, wherein the set of selectable UI items is a first set of selectable UI items, wherein the navigation tool is further for presenting a second set of selectable UI items that represents recent searched route directions.

21. The method of claim 20, wherein the second set of selectable UI items represents at least one recent searched route direction that was provided by a routing application represented by a selectable UI item in the first set.

22. The method of claim 20 further comprising providing an editable search field for receiving input for search operations, wherein the mapping application presents the second set of selectable UI items when the editable search field is selected.

23. The method of claim 13, wherein the set of editable UI controls comprises first and second editable text fields.

24. The method of claim 13, wherein the mapping application sends to the routing application additional information related to the first and second locations when the navigation tool receives the selection of the selectable UI item.

25. The method of claim 24, wherein the additional information comprises a name associated with one of the first and second locations.

26. The method of claim 24, wherein the additional information comprises a phone number associated with one of the first and second locations.

* * * * *